US006223114B1

United States Patent
Boros et al.

(10) Patent No.: US 6,223,114 B1
(45) Date of Patent: Apr. 24, 2001

(54) PROCESS FOR CONTROLLING DRIVING DYNAMICS OF A STREET VEHICLE

(75) Inventors: Imre Boros, Wolfschlugen; Dieter Hamann, Waiblingen; Rudolf Maurath, Esslingen; Joachim Pressel, Korntal-Muenchingen; Michael Reiner, Fellbach, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/273,760

(22) Filed: Mar. 22, 1999

(30) Foreign Application Priority Data

Mar. 20, 1998 (DE) ............................................. 198 12 237

(51) Int. Cl.$^7$ ............................... G06F 7/00; G06F 9/00; G06F 17/00; G06F 19/00; G06G 7/00
(52) U.S. Cl. ................................ 701/70; 701/1; 701/36; 701/41; 701/72; 701/50; 701/53; 701/55; 701/79
(58) Field of Search .................................. 701/70, 1, 36, 701/41, 72, 50, 53, 55, 79

(56) References Cited

FOREIGN PATENT DOCUMENTS 195 15 051    5/1996   (DE) .

OTHER PUBLICATIONS

Dr.–Ing Adam Zomotor, "Fahrwerktechnik: Fahrverhalten—Krafte am Fahrzeug, Bremsverhalten, Lenkverhalten, Testverfahren, MeBtechnik, Bewertungsmethoden, Versuchseinrightungen, aktive Sicherheit, Unfallverhutung," Herausgeber: Prof. Dipl.–Ing. Jornsen Reimpell, 1. Aufl.–Wurzburg: Vogel, 1987 (Vogel–Fachbuch).

"FDR—Die Fahrdynamik–regelung von Bosch" ATZ Automobiltechnische Zeitschrift 96 (1994) 11, pp. 674–689. (Month is not available).

"FAT Schriften Reihe NR. 95" Einsatz von Retardern in der Betriebsbremsanlage von zweigliedrigen Lastzuegen. Frankfurt 1992, Forschungsvereinigung Automobiltechnik e.V. (Month is not available).

*Primary Examiner*—William A. Cuchlinski, Jr.
*Assistant Examiner*—Ronnie Mancho
(74) *Attorney, Agent, or Firm*—Evenson, McKeown, Edwards & Lenahan, P.L.L.C.

(57) ABSTRACT

For regulating the driving dynamics of a road vehicle, setpoints for the yaw rate $\Psi$ and the float angle $\beta$ of the vehicle are generated continuously by evaluating a simulation computer implemented vehicle model. The simulation computer generates control signals for activating at least one wheel brake of the vehicle based on a comparison of the reference values $\Psi_{SO}$ as a setpoint, and the actual values $\Psi_I$ of the yaw rate continuously recorded by a yaw rate sensor. The vehicle model is represented by a linear differential equation system of the form $[P]\cdot(\dot{X})=[Q]\cdot(X)+(\bar{C})\cdot\delta(t)$. The driving-dynamic state values $\beta_Z(k-1)$ and $\Psi_Z(k-1)$ are updated at a point in time $t(k-1)$, followed by a point in time $t(k)$ that is later by a clock time interval $T_K$, by evaluation of the system of equations $$X(k) = \{T_k - [Q]\} \cdot \{T_k \cdot X(k-1) + C \cdot \delta(k)\}$$

with the values of the matrix elements $p_{ij}$ and $q_{ij}$ updated for that point in time $T_K$.

26 Claims, 5 Drawing Sheets

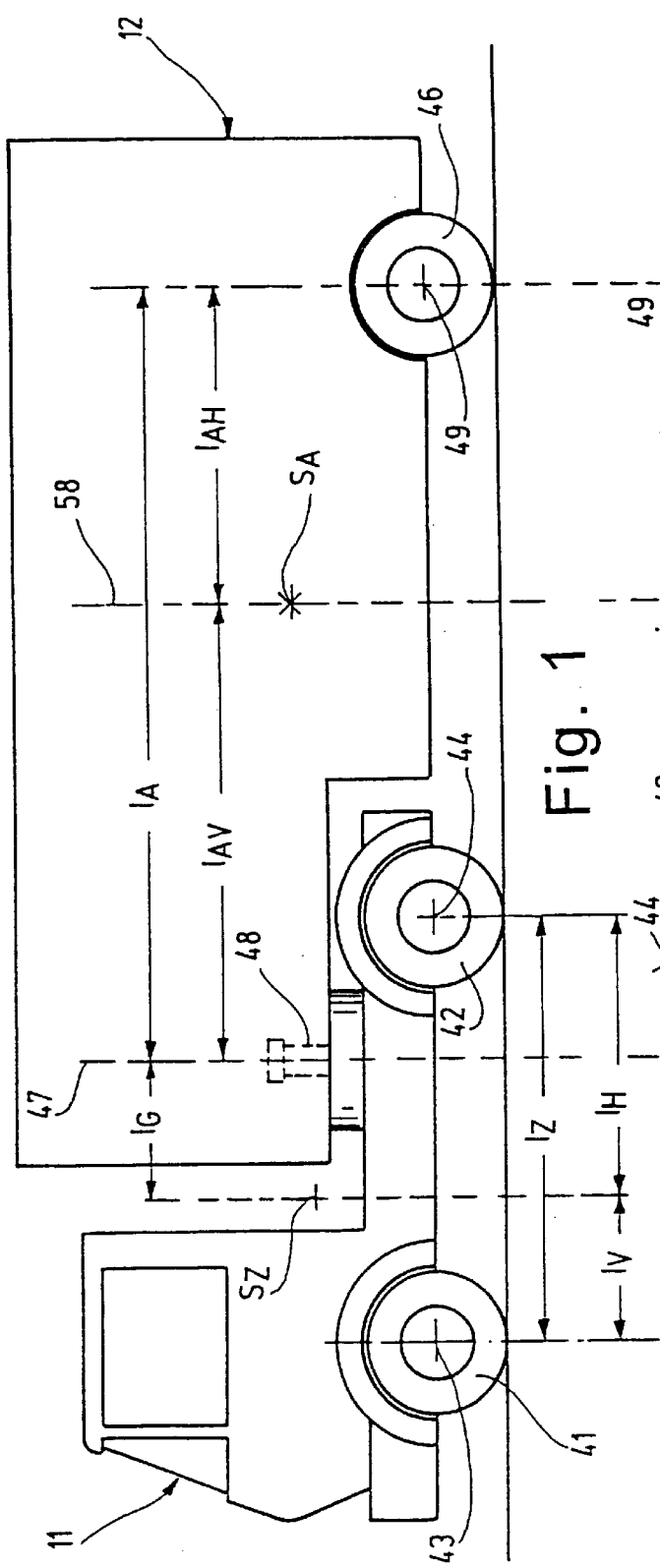
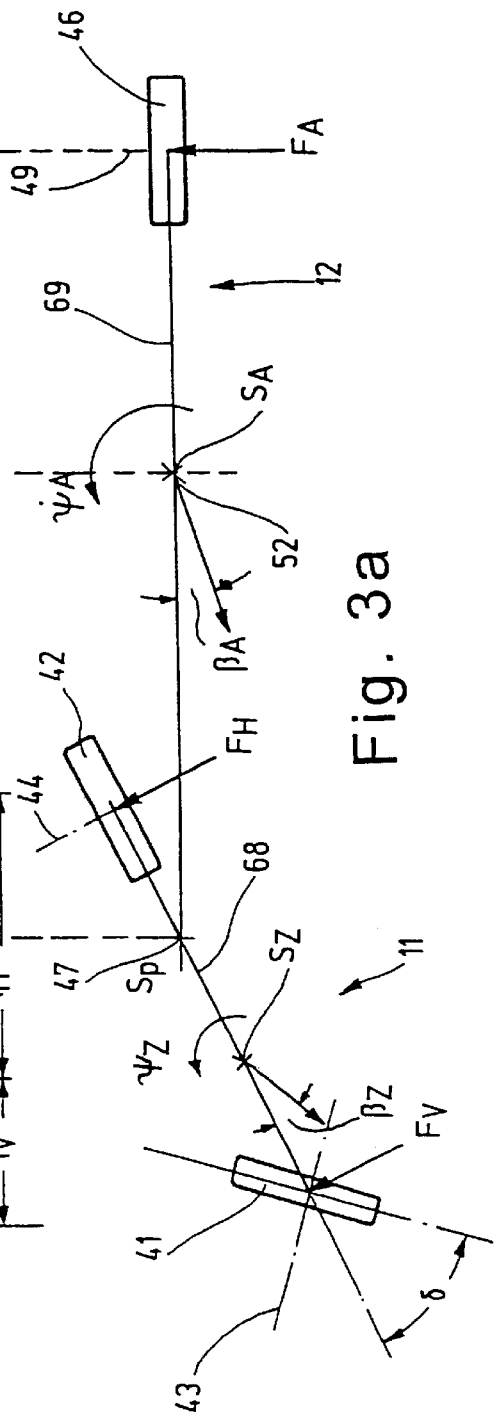
Fig. 1
Fig. 3a

PROCESS FOR CONTROLLING DRIVING DYNAMICS OF A STREET VEHICLE

BACKGROUND AND SUMMARY OF THE INVENTION

This application claims the priority of Germany patent document 198 12 237.3, filed Mar. 20, 1998, the disclosure of which is expressly incorporated by reference herein.

The invention relates to a method and apparatus for regulating the driving dynamics of a road vehicle.

In such method and apparatus reference values are generated by means of a simulation computer of an electronic control unit, under clock control in successive cycles of a predeterminable duration $T_K$ (5 to 10 ms, for example). The control unit implements an automatic regulation process based on a model that represents the vehicle in terms of parameters which depend on its design and its load state as well as its operating data, using measured current values of the vehicle steering angle $\delta$, vehicle speed $v_x$ and possibly the transverse acceleration $a_q$ for at least the yaw rate $\dot{\Psi}$ and the float angle $\beta$ of the vehicle. Control signals are generated based on a comparison of a setpoint $\dot{\Psi}_{SO}$ of the yaw rate of the vehicle with actual values $\dot{\Psi}_I$ of the yaw rate which are continuously recorded by means of a yaw rate sensor device. The result is used to activate at least one wheel brake of the vehicle and/or reduce the engine driving torque to compensate for deviations in the actual value of each critical setpoint.

A driving dynamics regulating method (FDR) of this kind is known from ATZ Automobiltechnische Zeitschrift, Vol. 96 (1994), No. 11, pages 674 to 689. In this known method, based on the so-called one-track model of a vehicle, a setpoint $\dot{\Psi}_{SO}$ is generated according to the relationship $$\dot{\Psi}_{so} = \frac{v_x \cdot \delta}{(a+c)\left(1 + \frac{v_x^2}{v_{CH}^2}\right)}$$

in which $v_{CH}$ represents the so-called characteristic speed of the vehicle; a is the distance of the front axle from the center of gravity of the vehicle; and c is the distance of the rear axle from the center of gravity of the vehicle.

The "characteristic speed" $v_{CH}$ refers to the vehicle-specific speed that corresponds to a maximum of the quotient $\dot{\Psi}/\delta$, which is valid for low transverse accelerations $\alpha_q \leq 3$ ms$^{-2}$. Driving dynamics regulation in this case takes the form of state regulation of float angle $\beta$ and the yaw rate. Float angle $\beta$, which expresses the difference between the direction of travel and the direction of the lengthwise axis of the vehicle, must not exceed a specified limiting value.

In the driving dynamics regulation explained thus far, because of the manner of generation of the setpoint for the yaw rate of the vehicle, especially when the driver produces a rapid change in the steering angle as the result of an "abrupt" steering maneuver, the actual value of the yaw rate $\dot{\Psi}$ of the vehicle deviates drastically from the setpoint. Because of the above-mentioned dependence of the steering angle, such deviation leads the actual value of the yaw rate of the vehicle, which changes more slowly as a result of the inertia of the vehicle, in every case. If the regulation responds in this case, it decreases the lateral guiding force at the rear axle of the vehicle, which in the above situation is undesirable because it causes an oversteering tendency in the wrong direction. At a later point in time such oversteering must be corrected by another regulating intervention.

Such a "regulating play", which results from the establishment of an unrealistic setpoint, represents a potential danger that should be avoided.

The goal of the invention therefore is to provide an improved method of the type described above which achieves a setpoint specification for the dynamic state values of the vehicle that corresponds to a realistic movement behavior of the vehicle.

Another object of the invention is to provide a device that is suitable for implementing the method.

These and other objects and advantages are achieved by the control arrangement according to the invention, which generates setpoints for the yaw rate $\dot{\Psi}_S$ and the float angle $\beta_S$, corresponding to a dynamically stable behavior of a two-axle vehicle, by means of a clock-controlled evaluation of the following relationships:

$$m_z \cdot v \cdot \beta + \frac{1}{v}(m_z \cdot v^2 + C_v \cdot 1_v - C_H \cdot 1_H) \cdot \dot{\Psi} + (C_v + C_H) \cdot \beta - C_v \cdot \delta = 0$$

and $$J_Z \cdot \ddot{\Psi} + \frac{1}{v}(C_v \cdot 1_v^2 + C_H \cdot 1_H^2) \cdot \dot{\Psi} - (C_H \cdot 1_H - C_v \cdot 1_v) \cdot \beta - C_v \cdot 1_v \cdot \delta = 0$$

Under the conditions selected according to the invention as stability criteria (namely that the transverse forces produced by rounding a curve as well as the lateral guiding forces that develop as a result of the change in the steering angle $\beta(t)$ must be compensated, and also that the rotating and yaw moments acting on the vehicle must be compensated) this relationship represents a more realistic model for the dynamic behavior of the real vehicle than the known method for establishing the setpoint of the yaw rate, since the inertial behavior of the vehicle must also be taken adequately into account by the vehicle model used according to the invention.

These relationships can be expressed as a matrix equation in the form $$[P] \cdot (\dot{\overline{X}}) = [Q] \cdot (\overline{X}) + (\overline{C}) \cdot \delta(t) \qquad (I)$$

in which [P] represents a 4×4 matrix with the elements $p_{ij}$ ($p_{ij}=0, m_Z v, 0, 0; 0, 0, 0, J_Z; 0, 0, 0, 0; 0, -1, 0, 0$), [Q] represents a 4×4 matrix with elements $q_{ij}$ ($q_{ij}=0, -C_V-C_H, 0, -m_Z \cdot v-(C_V l_V-C_H l_H)/v; 0, C_H l_H-C_V l_V, 0, (-1_v^2 C_v-1_H^2 C_H)/v; 0,0,0,0; 0,0,0,1$), $\overline{C}$ represents a four-component column vector with the components $c_i$ ($c_i=C_V, C_V l_V, 0, 0$), $\overline{X}$ represents a four-component column vector formed of the state values $\beta_Z$ and $\dot{\Psi}_Z$ with components $x_i$ ($x_i=0, \beta_Z, 0, \Psi_z$) and $\dot{\overline{X}}$ represents the time derivative $d\overline{X}/dt$. Evaluation of this relationship takes the form of an updating of the driving dynamic state values $\beta_Z(k-1)$ that have been determined at a point in time $t(k-1)$, to the point in time $t(k)$ that is later by the clock time length $T_k$, by evaluation of the relationship $$\overline{X}(k) = \left\{\frac{P}{T_k} - [Q]\right\}^{-1} \cdot \left\{\frac{P}{T_k} \cdot \overline{X}(k-1) + \overline{C} \cdot \delta(k)\right\}$$

with values of the matrix elements $p_{ij}$ and $q_{ij}$ that have been updated to the point t(k) (i.e., determined at that point in time).

The coefficient matrix [P] (associated with the time rates of change, $\ddot{\Psi}$ and $\dot{\beta}$, of the state values $\dot{\Psi}$ and $\beta$ which are to be controlled) of the matrix equation (I) that represents the vehicle reference model, contains only matrix elements that are "absolutely" constant independently of the vehicle data or are vehicle-specifically constant. That is, either they do not change during travel, or they are vehicle-specific constants that are multiplied by the lengthwise speed of the vehicle or are divided by the latter (i.e., values that, with a supportable knowledge of the vehicle-specific values, can be determined at any time from measurements of the lengthwise speed of the vehicle with corresponding accuracy).

The same is also true of the matrix elements of the matrix [Q] associated with the state values $\dot{\Psi}$ and $\beta$ to be regulated, the "state vector," provided they contain terms that are proportional and/or inversely proportional to the lengthwise speed of the vehicle and contain these terms as factors in other vehicle-specific constants.

The diagonal operating stiffness values $C_V$ and $C_H$ in the vehicle reference model describe the vehicle reaction to the setting of a steering angle at a given vehicle speed, with a specific axle and wheel load distribution. These quantities can also be considered as vehicle-specific constants and are determined in adaptive "learning" processes during steady-state rounding of a curve ($\dot{\Psi}=0, \dot{\beta}=0$, $\delta$=const., v=const.) by evaluating the relationships $$C_H = \frac{m_z \cdot v \cdot 1_v \cdot \dot{\Psi}}{\left(\frac{1_H \cdot 1_v \cdot \dot{\Psi}}{v} - \beta \cdot 1_v - \beta \cdot 1_H + \frac{1_H^2 \cdot \dot{\Psi}}{v}\right)}$$

and $$C_H = \frac{m_z \cdot v \cdot 1_v \cdot \dot{\Psi}}{\left(\frac{1_H \cdot 1_v \cdot \dot{\Psi}}{v} - \beta \cdot 1_v - \beta \cdot 1_H + \frac{1_A^2 \cdot \dot{\Psi}}{v}\right)} \cdot \frac{\left(1_H \cdot \beta - \frac{1_H^2 \dot{\Psi}}{v}\right)}{\left(\frac{1_v \dot{\Psi}}{v} + \beta - \delta\right)}.$$

The knowledge of the float angle $\beta_Z$ required for determining the diagonal travel stiffnesses can be obtained (for the case of a vehicle's steady-state rounding of a curve with slight transverse acceleration) by an evaluation of the known relationship $\beta_Z=1_H/R_S$, wherein $R_S$ represents the road radius of the center of gravity of the vehicle, give by the relationship $R_s=(1_H^2+R_H^2)^{1/2}$; and $R_H$ represents the average of the road radii of the rear wheels of the vehicle, which can be determined with a knowledge of the wheelbase of the rear wheels from the wheel rpm values of said wheels in accordance with known relationships.

Alternatively or in addition thereto, under the same boundary conditions the float angle $\beta_Z$, as provided according to Claim 2, can also be determined by an evaluation of the is relationship $$\beta_z = \delta \cdot \frac{1_H}{1_z}$$

According to another alternative, the float angle $\beta_Z$ can be determined according to the relationship $$\beta_z = \int_{t_0(\delta=0)}^{t_c(\delta=\delta_c)} \left(\frac{a_q}{v} - \dot{\Psi}\right) dt,$$

in which $a_q$ refers to the vehicle transverse acceleration that builds up with the beginning of the adjustment of a steering angle. This alternative has the advantage that an exact determination of the float angle is possible even with relatively high vehicle transverse accelerations. Hence, a more exact determination of the diagonal travel stiffnesses is also possible, with the transverse acceleration $a_q$ being measured by a transverse acceleration sensor or even determined by computer from the radius of the curve being traveled and the speed of the vehicle.

In a preferred embodiment of the method according to the invention, in order to generate dynamically stable movement behavior of a vehicle, with corresponding setpoints for the state is values of the yaw rate and float angle, a one-track model of a tractor-trailer unit with a one-axle trailer is used to supplement, as it were, the two-axle tractor, with the force and moment equilibrium at the tractor and trailer being selected as a stability criterion once again, according to the relationships $$m_z \cdot v \cdot (\dot{\beta} + \dot{\Psi}_z) = F_V + F_H - F_G$$

$$J_z \dot{\Psi}_z = F_V \cdot 1_v - F_H \cdot 1_H + F_G \cdot 1_G$$

$$m_A \cdot v \cdot (\dot{\beta}_A + \dot{\Psi}_A) = F_G + F_A$$

$$J_A \dot{\Psi}_A = F_G \cdot 1_{AV} - F_A \cdot 1_{AH}$$

The kinematic coupling (which corresponds to the identity of the speed direction at the articulation point of the tractor and trailer) is taken into account by the relationship $$\beta_z - \frac{1_G}{v} \cdot \dot{\Psi}_z + \Psi_z = \beta_A + \frac{1_{AV}}{v} \cdot \dot{\Psi}_A + \Psi_A$$

In this relationship, $F_V$, $F_H$, and $F_G$ represent the respective transverse forces acting on the front wheels, rear wheels, and at the articulation point [fifth wheel]; $1_G$ represents the distance of the articulation point from the center of gravity of the tractor; $1_{AV}$ and $1_{AH}$ represent the distance of the center of gravity of the trailer from the pivot point and/or the tractor axis; and $F_A$ represents the lateral force acting on the trailer axis. In this vehicle model, the trailer is implemented so to speak only by "additive" values so that it is suitable both for generating setpoints for the tractor alone, and for the tractor-trailer unit as a whole. It can also be modified in suitable fashion and with an explanation, for generating setpoints for a tractor-trailer unit.

In this model of a tractor-trailer unit the float angle $\beta_A$ of the trailer is determined by the relationship $$\beta_A = \varphi + \beta_z - \frac{\dot{\Psi}(1_G + 1_{AV})}{v}$$

in which $\varphi$ represents the kink angle formed by the intersection of the lengthwise central planes of the tractor and trailer at the articulation point. This relationship is valid for the case of steady-state travel around a curve in which the tractor and trailer have the same yaw rate $\dot{\Psi}$.

The kink angle can be determined by measurement, alternatively or in addition, for the case of steady-state travel around a curve with a relatively low value for the transverse acceleration if the trailer is equipped with wheel rpm sensors.

According to another feature of the invention, by means of an electronic processing unit, relationships that can be evaluated rapidly for the diagonal travel stiffnesses $C_V$, $C_H$, and $C_A$, with which the effective tire lateral forces acting on the wheels are linked by the relationships $$F_v = -C_v \cdot \left(\beta_z - \delta + \frac{1_v}{v}\Psi_z\right)$$

$$F_H = -C_H \cdot \left(\beta_z - \frac{1_H}{v}\Psi_z\right)$$

$$F_A = -C_A \cdot \left(\beta_A - \frac{1_{AH}}{v}\Psi_A\right)$$

With respect to a device for regulating the driving dynamics in a road vehicle, the goal recited at the outset is achieved by implementing routines in an electronic control unit. This makes it possible to determine adaptively, from measurable parameters on a tractor that is being driven and/or a train consisting of the tractor and a trailer, at least the following values and to store them in a memory so that they can be called up:

a) Total mass $m_{total}$ of the train,
b) Mass $m_Z$ of the tractor,
c) Mass $m_A$ of the trailer,
d) Wheelbase $l_Z$ of the tractor,
e) Axle load distribution $A/P_{HA}$ of the tractor,
f) Axle load distribution of the train or the rear axle load $P_{HA}$ of the trailer as well as routines for estimating the following:
g) Moment of inertia $J_Z$ of the tractor around its main axis, and
h) Moment of inertia $J_A$ of the trailer around its main axis.

During driving, the vehicle operating parameters are constantly compared with reference values, in order to recognize states that are unstable as far as driving dynamics are concerned. By implementing these routines, the vehicle model that serves for generating these reference values is constantly adapted to the current load state of the vehicle, which can be very different from one trip to the next for commercial vehicles. Such adaptive determination of these values also has the advantage that vehicle-specific programming cost for the electronic control unit of the driving dynamics regulating device is minimized. Thus, improper inputs which could result in malfunctions of the regulation during operation of the vehicle cannot occur.

The concept of adaptive determination of practically all data that are significant for effective driving dynamics regulation, makes it possible to set the regulating device for the greatest variety of vehicle types and sizes. It is therefore advantageous, even from the standpoints of economical manufacture and economical use of the regulating device.

In a routine for determining the mass $m_Z$ of a tractor (and possibly the total mass $m_{total}$ of a tractor-trailer unit or multiple trailer unit, as well as the mass $m_A$ of the trailer) according to another embodiment of the invention, signals that are available from the electronic engine control as well as the output signals from wheel rpm sensors provided for brake and drive-slip regulation, which can also be used to determine the wheelbase $l_Z$ of the tractor, which, alternatively or additionally, can also be determined from the steering angle information, the yaw rate, and the lengthwise speed of the tractor.

A kink angle sensor can be provided in a tractor-trailer unit to determine the angle φ at which, when rounding a curve, the vertical lengthwise central planes of the tractor and trailer intersect at the axis of articulation (the fifth wheel), associated with wheel rpm sensors on the wheels of the trailer. In this case, both the length $l_A$ of the trailer and the distance $l_{SH}$ of the fifth wheel from the rear axle of the tractor can be determined adaptively.

For an adaptive determination of the axle load distribution of a two-axle vehicle (trailer) it is sufficient for the vehicle to be equipped with a single-axle load sensor so that depending on the location of this axle load sensor on the front or rear axle, the distance $l_V$ of its center of gravity from the front axle can be determined in accordance with alternative routines.

Similarly, the mass distribution of the trailer of a tractor-trailer unit (i.e., the distance $l_{AV}$ of its center of gravity from the fifth wheel) can be determined if the trailer is equipped with an axle load sensor for the load $P_{AHA}$ supported on the road by the axle of the trailer, and if the tractor is equipped with a rear axle load sensor. Alternatively or in addition, the distance $l_{AV}$ can be determined adaptively if a load sensor is provided whose output signal is a measure of the mass component $m_{AS}$ of the trailer supported on the tractor at the fifth wheel.

Estimated values for the yaw moment of inertia $J_Z$ of a tractor (for example a truck with a load state that varies from one trip to the next) and/or for the yaw moment of inertia $J_A$ of a tractor with one or more axles, are sufficiently accurate according to experience for a realistic vehicle model.

In vehicles that have air suspension, an axle load sensing system can be simply implemented by measuring the pressures in the pneumatic wheel springs.

If no axle load sensors are present, it is possible in any case to determine the rear axle load $P_{HA}$ as well as the front axle load $P_{VA}$ by braking tests if the tire-specific constants $k_{HA}$ and $k_{VA}$ are known. The latter in turn can be determined for the individual wheels.

By means of another routine according to the invention, the current values of the tire constants can be determined continuously. This feature is especially advantageous since these tire constants can be temperature dependent and therefore can change in the course of a trip.

To provide a realistic estimate of the tire constant of a vehicle, it may be sufficient according to another feature of the invention to determine axle-related tire constants $k_{HA}$ and $k_{VA}$ for the driven vehicle wheels and the non-driven wheels. In this case, the tire constant is determined for the driven wheels (for example the rear wheels of the vehicle) in the traction mode of the tractor, and the tire constant for the non-driven wheels during braking operation of the vehicle is determined with the value thus known for this tire constant.

In the case of any design of a commercial vehicle with a trailer, either a semitrailer or a towed trailer, it is optimum for both the tractor and the trailer to be equipped with a yaw angle sensor so that a dynamically unstable state of the entire tractor-trailer unit can be recognized quickly and reliably on the basis of different yaw rates of the tractor and the trailer.

Other objects, advantages and novel features of the present invention will become apparent from the following detailed description of the invention when considered in conjunction with the accompanying drawings.

BRIEF DESCRIPTION OF THE DRAWINGS

FIG. 1 shows a commercial vehicle in the form of a tractor and semitrailer in a schematically simplified side view to explain driving dynamic relevant vehicle-specific geometric values of the vehicle as a whole;

FIG. 3a is a one-track model of the tractor-semitrailer unit according to FIG. 1;

DETAILED DESCRIPTION OF THE DRAWINGS

Figure 2:
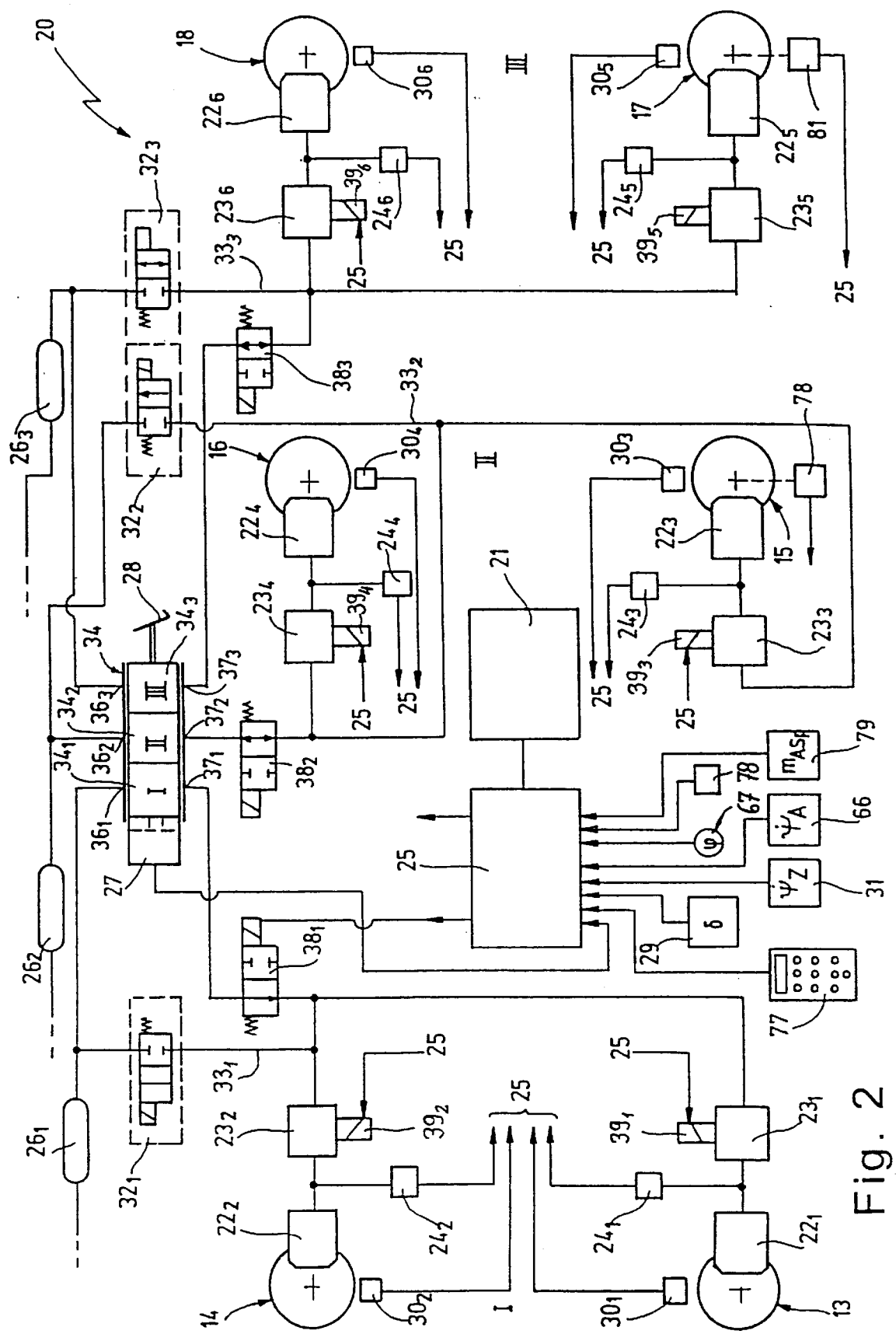
FIG. 2 is a schematically simplified block diagram of a brake system suitable for the tractor-semitrailer unit according to FIG. 1, with braking force adjusting members and sensors suitable for implementing driving dynamic regulation as well as an electronic control unit for driving dynamic regulation.

Referring to FIG. 1, the tractor-semitrailer unit 10, which consists of a two-axle tractor 11 and a one-axle trailer 12, is equipped with a device for regulating driving dynamics. In addition to the functions of an antilock braking system (ABS), which results in an adhesion-optimized braking behavior of both the tractor 11 and the tractor-semitrailer unit 10 as a whole, and anti-slip regulation (ASR function) that promotes optimum use of the available forward driving forces, the device for regulating driving dynamics also offers the possibility of activating the wheel brakes 13 to 16 of tractor 11 (FIG. 2) and the wheel brakes 17 and 18 of the trailer 12, individually or several together, even independently of a controlling actuation of the brake system (designated as a whole by 20) of the tractor-semitrailer unit 10 in order to ensure a dynamically stable driving behavior of tractor-semitrailer unit 10, especially when rounding curves or descending hills.

To this extent, only the structural and functional properties of a known electropneumatic braking system for commercial vehicles are assumed for brake system 20 of tractor-semitrailer unit 10. For driving dynamic regulation (FDR function), intervention in engine control is also assumed, for example in such fashion that braking towing moments, which can occur when the engine 21 of the tractor is in the engine-braking mode, can be compensated partially or completely.

Accordingly, pneumatic actuators $22_1$ to $22_4$ and $22_5$ and $22_6$ are provided, associated individually with the wheel brakes 13 to 18 of the tractor 11 and/or trailer 12. Such actuators can be filled with individually adjustable "braking" pressures by controlling "brake pressure" regulating valves $23_1$ to $23_6$ (shown schematically). Such pressures can be monitored individually by "brake pressure" sensors $24_1$ to $24_6$ individually assigned to actuators $22_1$ to $22_6$.

The brake pressure regulating values $23_1$ to $23_6$ are designed as electronically controllable solenoid valves that can be controlled by the output signals from an electronic control unit 25, which will be discussed in more detail later on with regard to its functions. Such solenoid valves are well known to an individual skilled in electronic circuitry, without necessity of going into detail about the details of the circuits of this electronic control unit 25.

In the embodiment chosen for explanation, brake system 20 is is designed as a 3-circuit brake system in which the front wheel brakes 13 and 14 of tractor 11 are combined into a brake circuit I, the rear wheel brakes 15 and 16 of tractor 11 are combined into a brake circuit II, and the wheel brakes 17 and 18 of trailer 12 are combined into a third brake circuit III. Individual pneumatic pressure reservoirs $26_1$ and $26_2$ and $26_3$, which are provided to supply the "brake" pressure, can be charged from a central compressed air source (not shown) which includes a compressor driven by vehicle engine 21 (also not shown).

Initiation of a vehicle deceleration desired by the driver is performed by operating the pedal of an electromechanical or electronic transducer 27 that generates an electrical output signal as a measure of the deflection of control pedal 28 from its basic position (non-actuated state of brake system 20), and hence a measure of the vehicle deceleration desired by the driver. The transducer output signal is fed to the electronic control unit 25 which processes this driver-desire signal together with additional signals, especially the output signal from a steering angle transducer 29 (shown schematically) and a yaw rate sensor 31 (also shown schematically), as well as output signals from wheel rpm sensors $31_1$ to $31_6$ associated individually with the vehicle wheels, with the output signals from these sensors each being a measure of the rpm values of the monitored vehicle wheels. Based on the results of such processing, the electronic control unit 25 generates control signals for brake circuits I, II, and III by individually assigned electropneumatic pressure modulators $32_1$, $32_2$, and $32_3$, by which the actuating pressures from the compressed air tanks $26_1$, $26_2$, and $26_3$ are metered to brake circuits I, II, and III. In the simplest case, these pressure modulators $32_1$, to $32_3$, as indicated in FIG. 2 by the valve symbols, can be designed as pulse-controllable 2/2-way solenoid valves, which connect the compressed air tanks $26_1$ to $26_3$ to the main brake lines $33_1$ and $33_2$ and $33_3$ of brake circuits I and II of tractor 11 or trailer 12 that connect to the respective brake pressure regulating valves $23_1$ to $23_6$.

The brake system 20 explained above makes it possible, under the control of the output signals from electronic control unit 25, both to control a desired braking force distribution to the various brake circuits I, II, and III and also to activate individual or multiple wheel brakes of the vehicle, regardless of whether the driver is operating the brake pedal 28 or not, thus fulfilling the requirements necessary for driving dynamics regulation.

In order to apply the brakes of tractor-trailer unit 10 even in the event of a malfunction of the electronic control system or a complete failure of the electrical system of the vehicle, a brake valve unit 34 that can likewise be operated by brake pedal 28. In this manner, in an emergency, control pressure can be connected "directly" from pressure tanks $26_1$, $26_2$, and $26_3$ to the main brake lines $33_1$, $33_2$, and $33_3$ of brake circuits I to III. In the embodiment chosen for the explanation according to FIG. 2, the brake valve unit 34 is represented by three proportional valves $34_1$, $34_2$, and $34_3$, whose valve pistons represented by the appropriately marked valve symbols are connected permanently mechanically with one another and are connected in a shapewise-moveable fashion with brake pedal 28 as well as with the pedal position sensor 27. The pressure supply connections $36_1$ and $36_2$ as well as $36_3$ of these proportional valves each are connected directly with the associated compressed air tanks $26_1$, $26_2$, and $26_3$, and the control outputs $37_1$, $37_2$, and $37_3$ of these proportional valves $34_1$, $34_2$, and $34_3$ are each connected by a switching valve $38_1$ and $38_2$ as well as $38_3$ to the main brake lines $33_1$ and $33_2$ as well as $33_3$ of brake circuits I, II, and III. These switching valves $36_{1,2,3}$ are designed as 2/2-way solenoid valves with a basic position 0 in which they are not energized (open), and a switching position I in which they are actuated and closed. When these switching valves $38_{1,2,3}$ are not energized or cannot be energized, the control outputs $37_{1,2,3}$ of brake valve unit 34 are connected in communication with the main brake lines $33_{1,2,3}$ of brake system 20. When the pressure modulators $32_{1,2,3}$ are not energized or cannot be energized, they likewise perform the function of a shutoff valve, as illustrated by the 2/2-way valve symbols for valves with a blocking basic position.

The brake pressure regulating valves $23_1$ to $23_6$ are also designed as solenoid valves. In the non-energized state of their control magnets $39_1$ to $39_6$ (i.e., the basic position), there is a communicating connection between actuators $22_1$ to $22_6$ with the respective main brake lines $33_{1,2,3}$, so that vehicle 10, in the event of a malfunction, can be reliably braked simply by actuating the brake valve unit 34.

In "normal," (i.e., electronically controlled and regulated) braking operation in terms of driving dynamics, switching valves $38_{1,2,3}$ are energized and assume their blocking switch positions I so that control pressure can be connected only through the electropneumatic pressure modulators $32_{1,2,3}$, controlled by output signals from electronic control unit 25, to the main brake lines $33_{1,2,3}$ of brake circuits I, II, and III.

To explain the functional details of the electronic control unit 25, we will now refer to the "single-track" model in FIG. 3a, in which the trailer 11 is represented by a single steerable front wheel 41 and a single nonsteerable rear wheel 42. The fixed axial distance $l_Z$ (FIG. 1) between the steerable and nonsteerable wheels is specified by the relationship $l_Z=l_V+l_H$, in which $l_V$ represents the distance of the axis of rotation 43 of front wheel 41 from the center of gravity $S_Z$ of tractor 11 and $l_H$ represents the distance of the axis of rotation 44 of the rear wheel 42 from the center of gravity $S_Z$ of tractor 11. Similarly, the trailer (i.e., in the example selected for explanation, the semitrailer 12) is represented by a single vehicle wheel 46 which is located at a fixed distance $l_A$ from the vertical axis of articulation 47 at the fifth wheel 48, by means of which semitrailer 12 is connected with articulation but without tension with tractor 11. The distance $l_A$ is expressed by the relationship $l_A=l_{AV}+l_{AH}$, in which $l_{AV}$ is the distance of fifth wheel $S_P$ or axis of articulation 47 from the center of gravity $S_A$ of semitrailer 12 and $l_{AH}$ represents the distance of the center of gravity $S_A$ of semitrailer 12 from the axis of rotation 49 of the "single" semitrailer wheel 46, by which in theory one or more wheel pairs can be represented.

In FIG. 1, reference numeral 51 represents the vertical axis of inertia that passes through the center of gravity $S_Z$ of the tractor, with respect to which the tractor 11 has the moment of inertia $J_Z$ because of its mass distribution. Similarly, 52 refers to the vertical axis of inertia that passes through the center of gravity $S_A$ of semitrailer 12, relative to which semitrailer 12 has a moment of inertia $J_A$ because of its mass distribution. The term $l_G$ refers to the distance of fifth wheel $S_P$ or axis of articulation 47 of the fifth wheel 38 from the vertical axis of inertia 51 of tractor 11 that passes through the center of gravity $S_Z$ of the tractor.

Figure 3B:
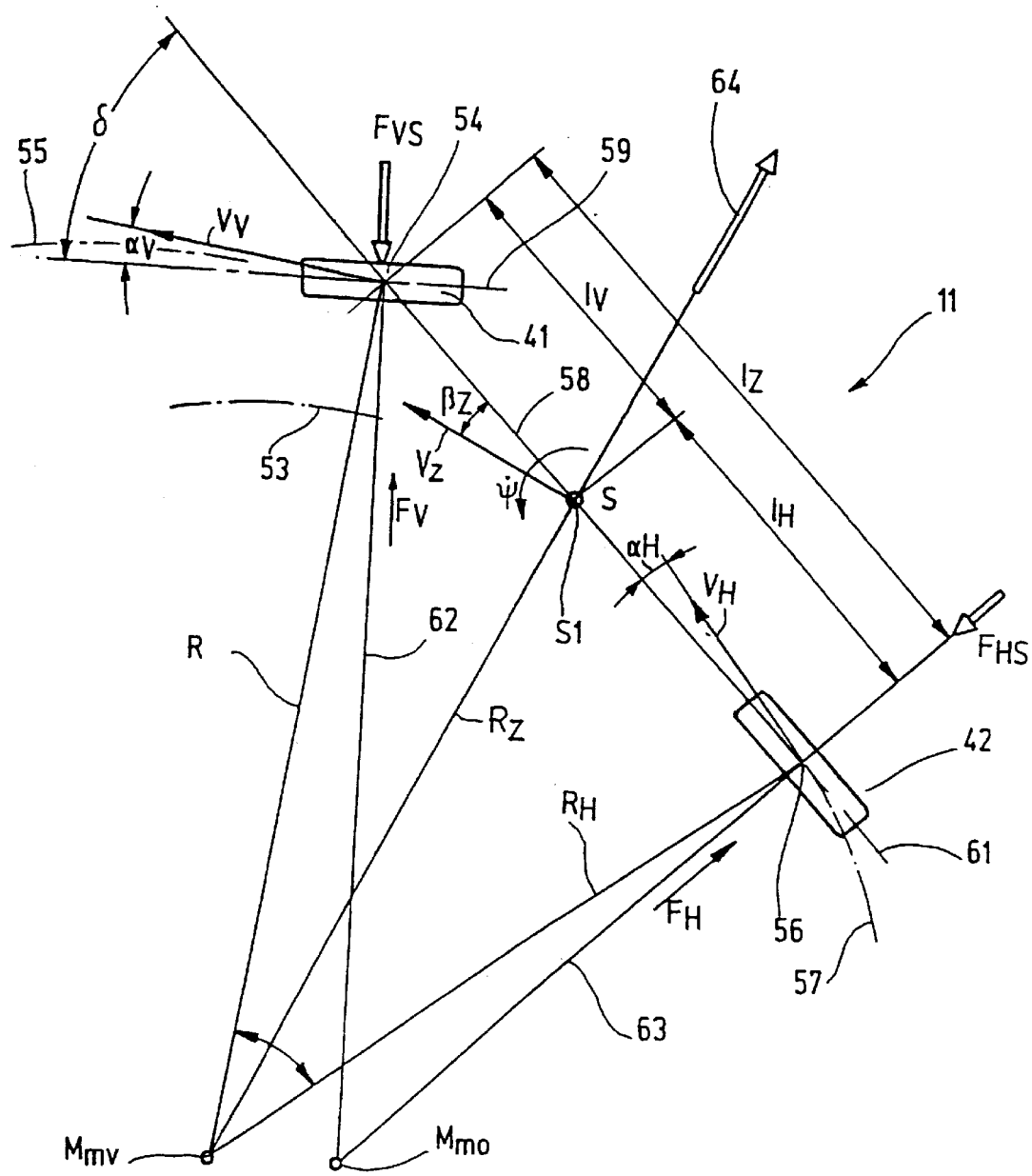
FIG. 3b is a one-track model of the tractor of the tractor-semitrailer unit according to FIG. 1, for explaining the kinematics of the tractor-semitrailer unit when rounding a curve or that of the tractor according to FIG. 1.

To explain the dynamic behavior of the tractor-semitrailer unit 10 represented by the one-track model according to FIG. 3a, the tractor 11 (FIG. 3b) will first be considered alone assuming that the tractor is in steady-state "left-hand" travel around a curve. That is, the road speed represented by vector $v_Z$ with which the center of gravity $S_Z$ of the tractor 11 is moving along its path 53 with a radius $R_Z$, is constant. Accordingly, the same is also true of front wheel 41 whose footprint 54 moves along a circle 55 on the road whose radius $R_V$, produced by the kinematics of tractor 11, has a slightly larger radius than the circle 53 traced by the center of gravity $S_Z$ of the tractor. It is true also for the rear wheel 42, whose footprint 56 moves along a circle 57, with these circles 53, 55, and 56 being concentric circles relative to a common moment pole $M_{mv}$.

As a result of the vehicle geometry (wheel base $l_Z$ and horizontal spacing $l_H$ of the vertical axis of inertia 51 of tractor 11 from the footprint 56 of rear wheel 42), the difference between the instantaneous direction in which vehicle 11 is moving as a whole and the instantaneous direction in which its vehicle lengthwise axis 58 extends (represented in FIG. 3b by the connecting line of the footprints 54 and 56 of the front wheel 41 and the rear wheel 42 of vehicle 11, for the limiting case in which front wheel 41 moves in the direction of its wheel center plane 59, which is adjusted by the steering angle δ set by the driver relative to vehicle lengthwise axis 58, and the rear wheel 42 likewise moves in the direction of its wheel center plane 61, i.e. in the direction of vehicle lengthwise axis 58), a float angle $\beta_Z$ is obtained by the relationship $$\beta_z = \frac{\delta \cdot l_H}{l_z}.$$

This relationship is valid for the case when the road speed $v_Z$ of vehicle 11 is so low that the influence of the centrifugal forces acting on the vehicle and resulting from rounding a curve is negligible for the for its transverse dynamics.

In this limiting case, the momentary pole $M_{m0}$ of the movement of the vehicle is expressed by the intersection of axis of rotation 43 of front wheel 41 with axis of rotation 44 of rear wheel 42. This limiting case, according to the one-track model chosen for explanation, corresponds to rolling of front wheel 41 and rear wheel 42 of tractor 11, free of side-slip, in the direction of the respective wheel center planes 59 and 61.

In rounding a curve at a speed $v_Z$ that is significantly different from 0, however, transverse accelerations develop that result in a centrifugal force $F_C$ expressed by the relationship $$F_c = m_z \cdot v_z (\dot{\Psi}_z + \dot{\beta}_z)$$

where $\dot{\Psi}_z$ refers to the yaw rate at which the vehicle turns around its vertical axis of inertia 51 that passes through the center of gravity $S_z$, and $\dot{\beta}_z$ represents the time rate of change in the float angle, which however is zero for steady-state rounding of a curve.

Diagonal travel angles $\alpha_V$ and $\alpha_H$ of front wheel 41 and rear wheel 42 of tractor 11 correspond to these lateral forces that push tractor 11 "outward" in the direction of the centrifugal force $F_C$ represented by arrow 64, to distinguish the direction of movement of front wheel 41 and rear wheel 42 represented by the direction of their road speed vectors $v_V$ and $v_H$, from the directions represented by the wheel center planes 59 and 61.

As a result of this diagonal travel of front wheel 41 and rear wheel 42, in the path of the respective tire, elastic deformations occur from which, at front wheel 41 and rear wheel 42, restoring forces result that act as lateral guide forces $F_{VS}$ and $F_{HS}$. Such restoring forces in turn increase with increasing values for the diagonal travel angles $\alpha_V$ and $\alpha_H$, and as a result hold the vehicle 11 on the road. The driver can specify a desired radius by controlling steering angle δ.

The lateral guiding forces $F_{VS}$ and $F_{HS}$ that, so to speak, hold a vehicle on the curve accordingly can be given by the following relationships $$F_{VS} = C_V \cdot \alpha_V \quad (1)$$

and $$F_{HS} = C_H \cdot \alpha_H \quad (2)$$

by which the coefficients $C_V$ and $C_H$ are defined in an elastic wheel model as diagonal travel stiffnesses.

The relationship (3) applies to the fifth wheel 48 of tractor-trailer unit 10 (FIG. 3a)

$$F_{AS} = C_A \cdot \alpha_A \quad (3)$$

In addition, the kinematic considerations initially presented only for the tractor also apply to the semitrailer 12, since semitrailer 12 can be considered as a vehicle that is articulated at fifth wheel 48. Because of this articulated coupling that corresponds to the identity of the speed directions of tractor 11 and semitrailer 12 at the fifth wheel 48, the relationship is as follows:

$$\beta_z - \frac{1_G}{v} \cdot \Psi_z = \beta_A + \frac{1_{AV}}{v} \Psi_A + \Psi_A \quad (4)$$

For the diagonal travel angles $\alpha_V$ and $\alpha_H$ as well as $\alpha_A$ to be used in relationships (1), (2), and (3), the following relationships are obtained directly from the kinematics of tractor-semitrailer unit 10 when rounding a curve:

$$\alpha_V = \delta - \beta - \frac{1_v}{v} \cdot \Psi_A + \Psi_A \quad (5)$$

$$\alpha_H = \beta_z - \frac{1_H}{v} \cdot \Psi_z \quad (6)$$

and $$\alpha_A = \beta_A - \frac{1_{AH}}{v} \cdot \Psi_z \quad (7)$$

From the dynamic stability criteria of the identity of the transverse forces acting on the tractor-trailer unit and the torques produced by the possible yaw movements of tractor 11 and trailer 12, the following relationships are obtained for tractor 11:

$$m_z \cdot v \cdot (\dot{\beta}_z + \dot{\Psi}_z) = F_V + F_H - F_G \quad (8)$$

relative to the equilibrium of the forces on tractor 11 and $$J_z \cdot \dot{\Psi} = F_v \cdot 1_v - F_H \cdot 1_H - F_G \cdot 1_G \quad (9)$$

relative to the equilibrium of the moments.

The following relationships apply to semitrailer 12:

$$m_A \cdot v \cdot (\dot{\beta}_A + \dot{\Psi}) = F_G + F_A \quad (10)$$

regarding equilibrium of forces and $$J_A \cdot \dot{\Psi}_A = F_G \cdot 1_{AV} - F_A \cdot 1_{AH} \quad (11)$$

for the equilibrium of the moments. From relationships (8), (9), and (11) on the basis of relationship (10) produces the following system of equations:

$$m_z \cdot v \cdot \dot{\beta}_z + m_z \cdot v \cdot \dot{\Psi}_z = F_v + F_H + F_A - m_A \cdot v \cdot \dot{\Psi}_A \quad (8')$$

$$m_A \cdot v \cdot (\dot{\beta}_A + \dot{\Psi}_A) = F_G + F_A J_z \cdot \dot{\Psi}_z = F_v \cdot 1_v - F_H \cdot 1_H - m_A \cdot v \cdot \dot{\beta}_A \cdot 1_G - m_A \cdot v \cdot \dot{\Psi}_A \cdot 1_G \quad (9')$$

$$J_A \cdot \dot{\Psi}_A = F_G \cdot 1_{AV} - F_A \cdot 1_{AH}$$

as well as $$J_A \cdot \dot{\Psi}_A = m_A \cdot v \cdot \dot{\beta}_A \cdot 1_{AV} + m_A \cdot v \cdot \dot{\Psi}_A \cdot 1_v - F_A \cdot 1_{AV} - F_A \cdot 1_{AH} \quad (11')$$

If the time derivative of relationship (4) is added to this system of equations as a fourth equation (4'), which, so to speak, describes the coupling of the dynamics of tractor 11 with the dynamics of semitrailer 12, we obtain for the dynamic state values $\dot{\Psi}_A, \dot{\Psi}_z, \beta_A,$ and $\beta_z$ a system consisting of a total of four coupled linear differential equations of the first order. When the values $F_V$, $F_H$, and $F_A$ are replaced by relationships (1), (2), and (3) and the diagonal travel angles $\alpha_V, \alpha_H,$ and $\alpha_A$ are replaced by the relationships (4), (5), and (6), these equations can be stated in the following form:

$$m_z \cdot v \cdot \dot{\beta}_z + m_A \cdot v \cdot \dot{\beta}_A = \quad (8'')$$
$$-(C_V + C_H) \cdot \beta_z + \left(\frac{C_H \cdot 1_H - C_v 1_v}{v} - m_z \cdot v\right) \cdot \Psi_z -$$
$$C_A \cdot \beta_A + \left(\frac{C_A \cdot 1_{AH}}{v} - m \cdot v\right) \cdot \Psi_A + C_V \cdot \delta$$

$$J_z \cdot \dot{\Psi}_z = \quad (9'')$$
$$m_A \cdot v \cdot 1_G \cdot \dot{\beta}_A + (C_H \cdot 1_H - C_v \cdot 1_v) \cdot \beta_z - \left(\frac{C_v \cdot 1_v^2 + C_H 1_H^2}{v}\right) \cdot \Psi_z +$$
$$C_A \cdot 1_G \cdot \beta_A + \left(m_A \cdot v \cdot 1_G - \frac{C_A \cdot 1_{AH} \cdot 1_G}{v}\right) \Psi_A + C_v \cdot 1_v \cdot \delta$$

$$J_A \cdot \dot{\Psi}_A = m_A \cdot v \cdot 1_{VA} \cdot \dot{\beta}_A + C_A(1_{AV} + 1_{AH}) \cdot \beta_A + \quad (11'')$$
$$\left(m_A \cdot v \cdot 1_{AV} - \frac{C_A \cdot 1_{AH}(1_{AV} + 1_{AH})}{v}\right) \cdot \Psi_A$$

$$\dot{\beta}_z - \frac{1_G}{v} \cdot \dot{\Psi}_z - \dot{\beta}_A - \frac{1_{AV}}{v} \cdot \dot{\Psi}_A = \Psi_A - \Psi_z \quad (4'')$$

This system of differential equations (8"), (9"), (11"), and (4") in the one-track model view of vehicle 10 generally describes its driving dynamics, i.e. including consideration of the time rate of change in the vehicle speed v, steering angle δ, yaw rates $\dot{\Psi}_z$ and $\dot{\Psi}_A$, and the float angles $\beta_Z$ and $\beta_A$ of tractor 11 and semitrailer 12. For the case of steady-state travel around a curve in which the steering angle δ and the vehicle speed v are constant and no changes occur in the yaw rates or in the float angles it assumes the following form:

$$0 = -(C_v + C_H) \cdot \beta_z + \left(\frac{C_H 1_H - C_C 1_v}{v} - m_z \cdot v\right) \Psi_z - \quad (8''')$$
$$C_A \beta_A + \left(\frac{C_A \cdot 1_{AH}}{v} - m_A \cdot v\right) \cdot \Psi_A + C_v \cdot \delta$$

$$0 = +(C_H \cdot 1_H - C_v \cdot 1_v) \cdot \beta_z - \left(\frac{C_v 1_v^2 + C_H 1_H^2}{v}\right) \cdot \Psi_z + \quad (9''')$$
$$C_A \cdot 1_G \cdot \beta_A + \left(m_A \cdot v \cdot 1_G - \frac{C_A \cdot 1_{AH} \cdot 1_G}{v}\right) \cdot \Psi_A + C_v \cdot 1_v \cdot \delta$$

$$0 = \quad (11''')$$
$$C_A \cdot (1_{AV} + 1_{AH}) \cdot \beta_A + \left(m_A \cdot v \cdot 1_{AV} - \frac{C_A \cdot 1_{AH} \cdot (1_{AV} + 1_{AH})}{v}\right) \Psi_A$$

$$0 = \Psi_A - \Psi_Z \quad (4'')$$

Under the assumptions (presumed to be capable of fulfillment) that (i) the values $m_Z, l_H, l_V$ for tractor 11 and the values $m_A$ as well as $l_{AH}$ and $l_{AV}$ and $l_G$ for semitrailer 12 are known, (ii) the steering angle δ, vehicle speed v, and travel around a curve, which in this particular case is steady-state, according to relationship (4") identical yaw rates $\dot{\Psi}_z = \dot{\Psi}_A$ can be measured with sufficient accuracy, and (iii) the float angles $\beta_Z$ and $\beta_A$ of tractor 11 and semitrailer 12 can be estimated or determined with sufficient accuracy, the relationships (8'''), (9'''), and (11''') represent a linear algebraic system of equations from which the three "unknown" diagonal travel stiffnesses $C_V, C_H,$ and $C_A$ of the wheels of tractor trailer unit 10 can be determined in simple fashion, computer operations required in this regard are performed by means of a digital computer stage in electronic control unit 25.

As a result of the kinematic coupling of semitrailer 12 with tractor 11, the following relationship applies to the float angle $\beta_A$ of semitrailer 12:

$$\beta_A = \varphi + \beta_Z - \frac{\dot\Psi(1_G + 1_{AV})}{v}$$

where $\varphi$ refers to the kink angle between the lengthwise central planes of tractor 11 and semitrailer 12 when the vehicle is rounding a curve, and $\dot\Psi$ represents the common yaw rate of the tractor and semitrailer.

For the tractor 11 of a tractor-trailer unit 10 or a two-axle truck alone, the following "reduced" system of equations applies:

$$0 = -(C_v + C_H) \cdot \beta_z + \left(\frac{C_H \cdot 1_H - C_v \cdot 1_v}{v} - m_z \cdot v\right) \cdot \dot\Psi_z + C_v \cdot \delta \quad (8^{IV})$$

$$0 = (C_H \cdot 1_H - C_v \cdot 1_v) \cdot \beta_z - \frac{(C_v \cdot 1_v^2 + C_H \cdot 1_H^2)}{v} \cdot \dot\Psi_z + C_v \cdot 1_v \cdot \delta \quad (9^{IV})$$

One possibility for determining the float angle $\beta_Z$ of tractor 11 is the following: Beginning with the relationship $$F_c = m_z \cdot v \cdot (\dot\Psi_z + \dot\beta_z)$$

for the centrifugal force $F_c$ applied at the center of gravity of the tractor, the following relationship is obtained for the transverse acceleration $a_q$ acting on the vehicle:

$$a_q = \frac{F_c}{m_z} = (\dot\Psi_z + \dot\beta_z) \cdot v$$

and the following relationship is obtained for the float angle change $\dot\beta_z$ by a few simple changes:

$$\dot\beta_z = \frac{a_q}{v} - \dot\Psi_z$$

Beginning with travel in a straight line (which can be detected by steering angle $\delta=0$ remaining constant), if the driver, beginning at a point in time $t_0$ initiates travel around a curve by adjusting a steering angle $\delta$, the float angle $\beta_z$ develops according to the following relationship:

$$\beta_z = \int_{t_0(\delta=0)}^{t_c(\delta=\delta_c)} \left(\frac{a_q}{v} - \dot\Psi_z\right) dt$$

The float angle continues to increase until, during steady-state rounding of a curve ($v$=const., $\dot\Psi_z$=const.) the integrand becomes 0.

The electronic control unit 25 processes this relationship for example as follows:
The value $$\left(\frac{a_q(k)}{v(k)} - \dot\Psi_z(k)\right) \cdot \delta t$$

is formed continuously for small time steps [k=1, 2, . . . , n] whose duration $\delta_t$ is short by comparison with the time during which the driver "actuates" the steering, i.e. the steering angle $\delta$ changes until it is once again constant.

By adding up the amounts of the changes in the float angle $\beta_Z$ represented in this manner, their value is finally formed, whereupon the addition process can be interrupted as soon as the is following are true:

$$a_q=\text{const.}, \delta=\text{const., and } \dot\Psi_z=\text{const.} \quad [32B]$$

since starting at this "point in time," at which these three conditions are met, the integral can no longer grow.

With the float angles $\beta_Z$ obtained in this fashion, the diagonal travel stiffnesses $C_V$, $C_H$, and $C_A$ can be obtained from the system of equations $(8''')$, $(9''')$, and $(11''')$ for steady-state travel of the tractor-semitrailer unit, by purely algebraic operations that can be performed rapidly by electronic control unit 25.

Accordingly, from system of equations $(8^{IV})$, $(9^{IV})$ for the tractor alone, the diagonal travel stiffnesses $C_V$ and $C_H$ of the tractor can be determined so that if these are known, the diagonal travel stiffness $C_A$ of semitrailer 12 of tractor-semitrailer 10 can be calculated based only on relationship $(11''')$ of the system of equations $(8''')$, $(9''')$, and $(11''')$ which is valid as a whole for the tractor-semitrailer unit.

To determine the transverse acceleration $a_q$ that appears in the above relationship for the float angle $\beta_Z$ of the tractor, in the embodiment shown, a sensor 70 is provided which continuously delivers an electrical output signal that is characteristic of the transverse acceleration $a_q$, and can be processed by the electronic control unit 25.

Alternatively or in addition, the transverse acceleration $a_q$ can also be determined by computation from the known dimensions of the vehicle, the road speed $v$ of the vehicle wheels, and the road speed of the center of gravity of the vehicle that can be calculated from these figures.

If the values $\beta_A$ (float angle of the semitrailer), $\beta_Z$ (float angle of the tractor), $\dot\Psi_A$ (yaw rate of the semitrailer), and $\dot\Psi_Z$ (yaw rate of the tractor) are combined into a four-component (column) vector $\overline{X}$, the time derivations of these values are likewise combined into a four-component (column) vector $\dot{\overline{X}}$, and the diagonal travel stiffness $C_V$ of front wheel 41 of the one-track model vehicle and their product $C_V l_V$ with the distance of the front wheel from the center of gravity of tractor 11, are likewise combined to form a four-component (column) vector C (the vector $\overline{X}$ representing the current state of motion of the vehicle at a point in time k, and the vector $\dot{\overline{X}}$ represents the time rate of change in the state values), the following matrix equation is equivalent to system of equations (8"), (9"), (11"), and (4"):

$$[P] \cdot (\dot{\overline{X}}) = [Q] \cdot (\overline{X}) + (\overline{C}) \cdot \delta,$$

in which the matrices [P] and [Q] are each (4×4) matrices and the column vector $\overline{C}$ has only the components $c_1$ and $c_2$ as components that are different from 0.

The matrix elements $p_{ij}$ (i, j=1–4) of matrix [P] are given by the following relationships:

$$p_{11}=m_A \cdot v; \ p_{12}=m_z \cdot v; \ p_{13}=p_{14}=0$$

$$p_{21}=-m_A \cdot v \cdot 1_G; \ p_{22}=p_{23}=0; \ p_{24}=J_z$$

$$p_{31}=-m_A \cdot v \cdot 1_{AV}; \ p_{32}=0; \ p_{33}=J_A; \ p_{34}=0;$$

$$p_{41}=1; \ p_{42}=-1; \ p_{43}=1_{AV}/v; \ p_{44}=1_G/v.$$

The matrix elements $q_{ij}$ (i, j=1–4) of matrix [Q] are given by the following relationships:

$$q_{11}=C_A; \ q_{12}=-C_v-C_H; \ q_{13}=-m_A \cdot v+C_A \cdot 1_{AH}/v;$$

$$q_{14}=-m_z \cdot v-C_v \cdot 1_v/v+C_H \cdot 1_H/v;$$

$q_{21}=C_A \cdot 1_G; \quad q_{22}=C_H \cdot 1_H - C_V \cdot 1_V;$ $q_{23}=m_A \cdot v \cdot 1_G - C_A \cdot 1_G \cdot 1_{AH}/v; \quad q_{24}=-(1_V^2 \cdot C_V + 1_H^2 \cdot C_H)/v;$ $q_{31}=C_A \cdot 1_{AV} + C_A \cdot 1_{AH}; \quad q_{32}=0;$ $q_{33}=m_A \cdot v \cdot 1_{AV} - (C_A \cdot 1_{AV} \cdot 1_{AH} + C_A \cdot 1_{AH}^2)/v; \quad q_{34}=0;$ $q_{41}=q_{42}=0; \quad q_{43}=-1; \quad q_{44}=1$ The components $c_1$ to $C_4$ of the column vector $\overline{C}$ are given by the following relationships:

$c_1=C_V; \quad c_2=C_V \cdot 1_V; \quad c_3=c_4=0.$

The electronic control unit 25 of brake system 20 of tractor-semitrailer unit 10 is therefore designed to continuously provide (in accordance with a clock time T) a solution of matrix equation 12. That is, in the approximation governed by the one-track model of tractor-semitrailer unit 10, it generates outputs for the value $\beta_A$ of the float angle of semitrailer 12, the float angle $\beta_z$ of tractor 11, the yaw rate $\dot{\Psi}_A$ of semitrailer 12, and the yaw rate $\dot{\Psi}_z$ of tractor 11. For a comparison with measurable values it is interesting in this respect to examine the yaw rate $\dot{\Psi}_z$ of tractor 11 that is equipped with a yaw rate sensor 31, and possibly also the yaw rate $\dot{\Psi}_A$ of semitrailer 12 if the latter is likewise equipped with a yaw rate sensor 66.

If the tractor 11 of tractor-semitrailer unit 10 is equipped as assumed with a yaw rate sensor 31, and the yaw rate $\dot{\Psi}_A$ of semitrailer 12 can also be detected, it may be sufficient to use a comparatively simply implemented angle position sensor 67 to detect the instantaneous angle ϕ (FIG. 3d) between the lengthwise central plane 68 of tractor 11 and the lengthwise central plane 69 of semitrailer 12. A constant output signal from angle position sensor 67 indicates that the yaw rate of semitrailer 12 is the same as that of tractor 11, while a changing output signal of angle position sensor 67 in the form of an increase or decrease in angle m indicates that the yaw rate $\dot{\Psi}_A$ of semitrailer 12 is larger or smaller than that of tractor 11. In combination with a yaw rate sensor 31 for tractor 12, therefore, the yaw rate information for semitrailer 12 can likewise be obtained from angle position sensor 67.

Electronic control unit 25 performs the function of a simulation computer which, with a cycle of a specified duration (5 to 10 ms for example). It continuously updates the matrix element $p_{ij}$ of matrix P as well as matrix elements $q_{ij}$ of matrix Q of the matrix equation (12) that, so to speak, represents the vehicle model, and outputs solutions to these matrix equations (with a periodicity that is determined by the clock time T), with which actual value data measured directly or indirectly and the yaw angle rate $\dot{\Psi}_z$ and the yaw angle rate $\dot{\Psi}_A$ of the semitrailer are compared. In this manner, it detects a need for regulation of driving dynamics in accordance with conventional criteria with which the individual skilled in the art is familiar.

By solving matrix equation (12), electronic control unit 25 fulfills both the function of a setpoint generator and also of a comparator. That is, from a comparison of the setpoint and actual value, it generates the control signals required for driving dynamic regulation for the respective actuators $22_1$ to $22_6$ as well as the electropneumatic pressure modulators $32_1$, $32_2$, and $32_3$.

During driving of tractor-semitrailer unit 10, the matrix elements $p_{11}$, $p_{12}$, $p_{21}$, $p_{31}$, $p_{43}$, and $p_{44}$ of matrix [P], and the matrix elements $q_{13}$, $q_{14}$, $q_{23}$, $q_{24}$, and $q_{33}$ of matrix [Q] of matrix equation 12 which describes the reference model of the tractor-semitrailer unit 10, require constant updating for the vehicle speed v. The speed data required for this purpose are generated by the electronic control unit 25 from processing of output signals of the wheel rpm sensors $30_1$ to $30_6$; advantageously this is done by averaging of the output signals from only some of the wheel rpm sensors, for example those from the non-powered front wheels of tractor 11.

The load of tractor-semitrailer unit 10, which can be very different from one trip to the next is taken into account in matrix [P] of matrix equation (12) by its elements $p_{11}$, $p_{21}$, and $p_{31}$ that are proportional to the mass $m_A$ of semitrailer 12, the matrix element $p_{33}$ that represents the yaw inertial moment $J_A$ of the semitrailer, and the matrix element $p_{43}=1_{AV}/v$ that takes into account the position of the center of gravity $S_A$ of the semitrailer between the fifth wheel 48 and the semitrailer axis 49. It is taken into account in matrix Q by its matrix elements $q_{13}$, $q_{23}$, $q_{31}$, and $q_{33}$ which contain the terms that take the position of the center of gravity into account (factors $1_{AV}$ and $1_{AH}$) and, with the exception of the matrix element $q_{31}$, the terms that are directly proportional to the semitrailer mass $m_A$ as summands.

Assuming knowledge of the mass $m_z$ of the tractor, its wheel base $1_z$, its center of gravity located between the vehicle axles 42 and 44, and its moment of inertia $J_Z$, the distance $1_A$ of the rear axle 49 of semitrailer 12 from fifth wheel 48, and the distance $1_G$ of the fifth wheel from the yaw axis of inertia 51 of tractor 51, determination of the mass $m_A$ of the semitrailer and its consideration in the vehicle model represented by matrix equation (12) is possible because semitrailer 12 and tractor 11 are each equipped with an axle load sensor (not shown). Taking the vehicle geometry into account, load-proportional output signals from the axle load sensors permit a calculation of both the semitrailer mass $m_A$ and the location of the center of gravity $S_A$ of the mass of the semitrailer 12 between its rear axle 49 and the fifth wheel 48.

Alternatively to the description above using the output signals from two axle load sensors, the mass of the semitrailer $m_A$ can also be determined on the basis of the output signal from a single-axle load sensor of tractor 11 by an acceleration operation. With knowledge of the torque acting on the driven vehicle wheels (which can be determined from the operating data of the engine and the known value of the effective transmission ratios), the vehicle speed is calculated and from this the total mass ($m_z+m_A$) is calculated. The mass m. of the semitrailer is then determined as the difference between the total mass and the mass of the tractor. Electronic control unit 25 is advantageously designed for the implementation of both of these types of determination of semitrailer mass $m_A$.

The matrix element $p_{33}$ of matrix [P] that takes the yaw inertial moment $J_A$ of semitrailer 12 into account is approximated by the relationship $p_{33}=(A_V \cdot 1_{AV}^2 + A_H \cdot 1_{AH}^2) \cdot 1,1$ in which $A_V$ represents the semitrailer load at the fifth wheel 48, and $A_H$ represents the axle load at the semitrailer axle 49. For the overwhelming majority of possible loading arrangements of semitrailer 12, this relationship provides a good approximation of its moment of inertia as a function of the location of the center of gravity and the load in the semitrailer.

Assuming that the diagonal travel stiffnesses $C_V$, $C_H$, and $C_A$ of the wheels of tractor 11 and semitrailer 12 are constants, the respective sensor output signals from electronic control unit 25 can be used to determine the matrix elements of matrices P and Q of the reference model equation system (12), by simple operations that can be performed readily during short clock times. Thus, the matrix elements can be updated quickly depending on the situation.

In order to use the vehicle model represented by matrix equation (12) for real-time simulation of the actual vehicle behavior, the electronic control unit 21 handles this system of equations (12) with the following solutions:

$$\dot{\overline{X}}(k) = \frac{\overline{X}(k) - \overline{X}(k-1)}{T}$$

in which $\overline{X}(k)$ represents the solution vector of the system of equations (12). That is, the solution vector of matrix equation (12) to be obtained for the clock time interval numbered "k", $\overline{X}(k-1)$ refers to the solution vector of this system of equations (12) determined for the immediately previous clock time interval, and $\dot{\overline{X}}(k)$ represents the time derivative of the solution vector $\overline{X}(k)$ to be obtained.

Using expression (13) as the matrix operation on matrix equation (12) leads to the matrix equation $$\frac{[P]}{T} \cdot \overline{X}(k) - \frac{[P]}{T} \cdot \overline{X}(k-1) = [Q] \cdot \overline{X}(k) + \overline{C} \cdot \delta(k) \quad (14)$$

in which $\delta(k)$ represents the currently controlled steering intervention detected by steering angle sensors (29).

The combination of the terms that contain the "unknown" state vector $\overline{X}(k)$ and the combination of the known terms that contain the state vector $\overline{X}(k-1)$ and the current steering angle $\delta(k)$ yields the following relationship directly:

$$\frac{[P]}{T} \cdot \overline{X}(k) - [Q] \cdot \overline{X}(k) = \frac{[P]}{T} \cdot \overline{X}(k-1) + \overline{C} \cdot \delta(k) \quad (15)$$

and $$\left( \frac{[P]}{T} - [Q] \right) \cdot \overline{X}(k) = \frac{[P]}{T} \cdot \overline{X}(k-1) + \overline{C} \cdot \delta(k) \quad (15')$$

as the matrix equation for the solution vector $\overline{X}(k)$, for which the following is obtained directly from relationship (15'):

$$\overline{X}(k) = \left( \frac{[P]}{T} - [Q] \right)^{-1} \cdot \left( \frac{[P]}{T} \cdot \overline{X}(k-1) + \overline{C} \cdot \delta(k) \right).$$

To determine the float angle β, a so-called Luenberg observer is also suitable (cf. Otto Füllinger, Regelungstechnik, Einführung in die Methoden und ihre Anwendung, Dr. Alfred Lüthig Verlag Heidelberg, 1985, 5th edition, p. 340 et seq.). This possibility can be implemented by the electronic control unit 25 and will be explained briefly below with reference to FIG. 4. The electronic circuit version of this observer is well known to those skilled in the art of regulation technology, who can build such an observer with knowledge of its functions on the basis of their expert knowledge.

Figure 4:
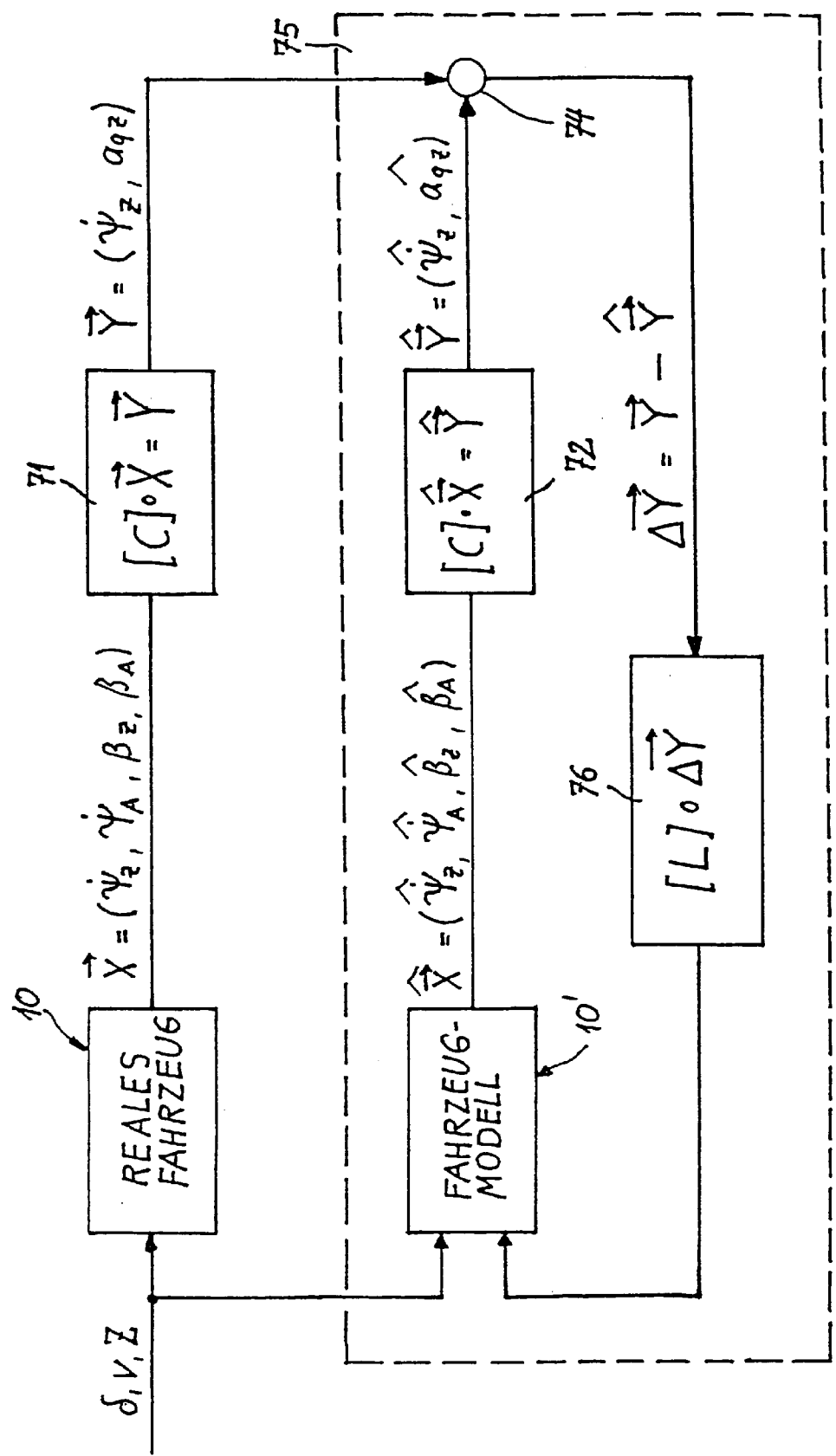
FIG. 4 is a schematically simplified block diagram to explain the function of a Luenberg observer that can be implemented by the electronic control unit and is suitable for obtaining reference values that are required for regulating technology.

In FIG. 4, the vehicle shown only schematically and assumed to be a tractor-semitrailer unit is again numbered 10. The vehicle is controlled by the driver by specifying the steering angle δ, a given vehicle speed v in accordance with the driver's wishes, and/or a certain vehicle deceleration z. 10' refers to an "electronic" model of the vehicle within the observer designated as a whole by 75. Control input signals are fed to this vehicle model 10', including the settings δ, v, and z which represent the actual vehicle 10 operation at the moment. From these inputs the vehicle model generates a state vector $\hat{X}$, that contains as components those state values ($\hat{\dot{\Psi}}_z$, $\hat{\dot{\Psi}}_A$, $\hat{\beta}$ and $\hat{\beta}_z$). The latter are compared with the actual state values represented by the state vector $\overline{X} = (\dot{\Psi}_z, \dot{\Psi}_A, \beta_A, \beta)$, that is produced by the behavior of the real vehicle 10.

The entire sensing system of the actual vehicle is represented by block 71 that delivers from the state vector $\overline{X}$, measured values for parameters correlated with this state vector, especially values for the yaw rate $\dot{\Psi}_z$ of tractor 11 and/or a measured value for the transverse acceleration $a_{qz}$ that develops when the vehicle is rounding a curve. It is important that the sensing system 71 generate at least one measured value that is unambiguously linked with the state vector $\overline{X}$, or a set $\overline{Y} = (\dot{\Psi}_z, a_{qz})$ of measured values that can be linked with it.

Observer 75 in turn is equipped with a simulation stage 72 which simulates a "sensing system". From the state vector outputs ($\hat{\dot{\Psi}}_z$, $\hat{\dot{\Psi}}_A$, $\hat{\beta}$ and $\hat{\beta}_z$) of vehicle model 10', it generates outputs that are comparable with the measured value outputs of sensing system 71 of the real vehicle 10, in the example chosen for explanation, these are the "measured signal vector" $\hat{\overrightarrow{Y}}$ with a format that is directly comparable with the values $\hat{\dot{\Psi}}_z$ and $a_{qz}$ in the measured value outputs of sensing system 71.

From the measured signal vectors $\hat{\overrightarrow{Y}}$ and $\hat{\dot{\Psi}}_z$ generated in this fashion, a comparison stage 74 of observer 75 forms the differential vector $\Delta \overline{Y} = \overline{Y} - \hat{\overline{Y}}$, that is supplied as a feedback input 76 to observer 75. By multiplication of the input $\Delta \overline{Y}$ by a feedback matrix [L], the observer generates control signals for vehicle model 10' as outputs which influence its "simulation" behavior; that is, its state output vector $\hat{X}$ is adjusted to the real state vector $\overline{X}$ as quickly as possible, but also with sufficient damping so that vehicle model 10' does not "overshoot."

In this type of regulation of vehicle model 10', for which the measured value outputs of the real vehicle 10 serve, so to speak, as setpoint specifications, it can be assumed that values that cannot be measured on the real vehicle 10 but can be represented readily "by computer" using vehicle model 10' also correspond to the corresponding values of the real vehicle, in the present case the float angles $\beta_A$ and $\beta_Z$.

In order for the vehicle model represented essentially by equations (8"), (9"), (11"), and (4') (from which the electronic control unit determines the driving-dynamic state values $\dot{\Psi}_z$ and $\beta_z$ as well as $\dot{\Psi}_A$ and $\beta_A$) to be adapted automatically to reality, as it were, taking into account in particular the load state of vehicle 10, by means of the sensing system of the vehicle and the electronic control unit 25, values ($m_Z$, $m_A$, $l_V$, $l_H$, $l_{AV}$, $l_{AH}$, and $l_G$) are determined adaptively. On the basis of these values, the matrix elements $p_{ij}$ of matrix [P] and the matrix elements $q_{ij}$ of matrix [Q] as well as the component $c_2$ of column vector $\overline{C}$ of relationship (12) can be determined. Knowledge of the latter is also a prerequisite for determining the diagonal travel stiffnesses $C_V$, $C_H$, and $C_A$. Advantageously, the electronic control unit 25 also includes an input unit 77 for entry of the calculated and measured and possibly also realistically estimated values of the above-mentioned parameters necessary for determining the matrix elements $p_{ij}$ and $q_{ij}$ of the electronic control unit. These parameters can be used at least as realistic "beginning" values, so that a vehicle model that is close to reality is available from the outset.

For the following explanation of an adaptive updating of the vehicle model, a design of the vehicle 10 as a tractor-trailer unit will be assumed. In such a unit, the mass $m_Z$ of the tractor, the distances $l_V$ and $l_H$ of its center of gravity from the front and rear axles, the distance $l_G$ of the fifth wheel from the center of gravity of the tractor, and its moment of inertia $J_Z$ around the vertical axis of the tractor that passes through the center of gravity are values that are governed by the vehicle design. These can be stored in a fixed-value memory of an electronic control unit, so that they can be called up in advance, with an additional mass represented by the driver being taken into account as a minor correction if desired.

It is also assumed that the tractor-trailer unit is equipped with an angular position sensor 67 and that an axle load sensor 78 is provided on tractor 11 which generates an electrical output signal that can be processed by the electronic control unit 25. Such signal is a measure of the portion $m_{ZHA}$ of the total mass $m_{total}$ of tractor-trailer unit 10 supported above the rear axle or, if the semitrailer is not attached, the measure of the portion of the mass of the tractor that is supported above the rear axle. With this sensing system (wheel rpm sensors $30_1$ to $30_6$ on all vehicle wheels, axle load sensor 78 for the rear axle of the tractor, and angular position sensor 67) the values $l_V$, $l_H$, $k_{AV}$, $l_{AH}$, and $m_A$ required for determining matrix elements $p_{ij}$ and $q_{ij}$ of the vehicle model can be determined as follows:

Initially, the total mass $m_{total}$ of the tractor-trailer unit 10 is determined by evaluating the relationship $$m_{ges} = \frac{M_{mot} \cdot \frac{n_{mot}}{v} \cdot \eta}{Z_{HSP} - Z_{ist}} \quad (17)$$

in which $M_{mot}$ represents the motor output torque measured in [Nm], $n_{mot}$ represents the engine rpm measured in [s−1], v represents the vehicle speed measured in [ms−1], $\eta$ represents the total efficiency of the transmission, indicated by a dimensionless number $\leq 1$, $Z_{HSP}$ represents the deceleration of the vehicle in an unpowered up-shift pause, in which the driver switches from one gear to the next higher, and $Z_{actual}$ represents the negative deceleration/acceleration of the vehicle which takes place following the "gear"0 change after the vehicle is accelerated in the next gear.

It is assumed here that a signal that can be processed by the electronic control unit 25 is available from the electronic engine control, said signal being a measure of the engine torque $M_{mot}$ and likewise a signal that is a measure of the engine rpm $M_{mot}$, which likewise is available from the so-called electronic engine control, and that, on the basis of the output signals of the wheel rpm sensors that are provided for antilock braking system control, the vehicle speed v and the deceleration or acceleration values $Z_{HSP}$ and $Z_{ist}$ can be determined with sufficient accuracy.

The value $m_{total}$ (total mass of tractor-trailer unit 10) determined by means of relationship (17) (which is also valid for a truck and trailer unit) is stored in a memory of the electronic control unit and checked automatically as often as the measurement requirements are specified, so that every change in mass, for example by partial unloading of semitrailer 12, is detected and can be taken into account into the vehicle model.

The partial mass $m_A$ of semitrailer 12 of tractor-trailer unit or a trailer in a truck and trailer unit whose tractor is a truck, can be obtained from the following relationship with knowledge of the partial mass $m_Z$ of the towing vehicle:

$$m_A = m_{total} - m_Z \quad (18)$$

In the case of a truck and trailer unit in which a truck serves as the towing vehicle, carrying a generally unknown load, the partial mass $m_Z$ in turn must be determined according to relationship (17) for solo operation of the truck by evaluation of relationship (17) if the truck is not equipped with a load-sensing system of its own (for example, axle load sensors), whose output signals can be processed by the electronic control unit 25 and contain the information about the mass of the towing vehicle.

In a tractor-trailer unit as well, it can be advantageous to determine the mass $m_Z$ of the tractor for solo operation thereof by evaluating relationship (17), at least to check for the input from electronic control unit 25 in this regard.

Assuming at least initially that for the tractor 11 of tractor-trailer unit 10, the values $l_V$ (distance of the center of gravity of the vehicle from the front axle), $l_H$ (distance of the center of gravity of the vehicle from the rear axle), and $l_G$ (distance of the fifth wheel 47 from the center of gravity 51 of tractor 11), and also its mass $m_Z$ as well as the moment of inertia $J_Z$ around the vertical axis of inertia 51 of tractor 11, are known by reason of the design data of the vehicle, and that the mass $m_A$ of semitrailer 12 as well as its length $l_A$ measured between fifth wheel 47 and the semitrailer axis 49 are known, in order to be able to determine the matrix elements $p_{ij}$ of matrix [P] and the matrix elements $q_{ij}$ of matrix [Q] of matrix equation (12), for semitrailer 12 it is only necessary to determine the values $l_{AV}$ (distance of its center of gravity 52 from fifth wheel 47 of tractor-trailer unit 10) and the distance $l_{AH}$ of the center of gravity 52 of the semitrailer from its rear axle. From these, it is possible to make a good approximation of the value $J_A$ of the moment of inertia using the relationship:

$$J_A = (m_{AV} \cdot 1^2_{AV} + m_{AH} \cdot 1^2_{AH}) \cdot 1,1 \quad (19)$$

in which $l_{AV}$ represents the distance of the fifth wheel 47 from the center of gravity 52 of the semitrailer 12 and $l_{AH}$ represents the distance of the center of gravity 52 of the semitrailer from the rear axle 49 of semitrailer 12, $m_{AV}$ represents the partial mass of semitrailer 12 supported at fifth wheel 47, and $m_{AH}$ represents the partial mass of the semitrailer 12 that is supported above rear axle 49.

The two values $l_{AV}$ and $l_{AH}$ are linked to one another by the relationship $$l_{AH} = l_A - l_{AV} \quad (20)$$

in which $l_{AV}$ satisfies the relationship $$1_{AV} = 1_A \cdot \left(1 - \frac{m_{ZHA} - m_{ZHAleer}}{m_A} \cdot \frac{1_Z}{1_{sv}}\right) \quad (21)$$

in which $m_{ZHA}$ represents the rear axle load on tractor 11 with the is semitrailer attached, $M_{ZHAleer}$ represents the rear axle load on the tractor without the semitrailer, $m_A$ represents the total mass of semitrailer 12, $l_Z$ represents the wheelbase of the tractor, and $l_{SV}$ represents the distance of the fifth wheel 47 from the front axle 43 of tractor 11.

If (as is assumed for the purpose of explanation) the rear axle load $m_{ZHA}$ of tractor 11 with semitrailer 12 attached is known from the output signal of the axle load sensor 78, the matrix elements $p_{ij}$ and $q_{ij}$ of matrices [P] and [Q] of matrix equation (12) can be determined, and the vehicle model that is represented by this matrix equation (12) is complete.

The same is also true if tractor 11 or semitrailer 12 is provided with a fifth wheel load sensor 79 which generates an electrical output signal that can be processed by the electronic control unit 25, as a measure of the semitrailer load at the fifth wheel 47 of tractor-trailer unit 10.

In this case, the value $l_{AV}$ is given by the relationship $$l_{AV} = l_A - \frac{m_{AS} \cdot l_A}{m_A} = l_A\left(1 - \frac{m_{AS}}{m_A}\right) \quad (22)$$

where $m_{AS}$ is the semitrailer load of the semitrailer 12 at fifth wheel 47.

In this case also, the value $l_{AH}$ is provided by the relationship (20).

The value $l_{AV}$ can be determined, adaptively, even when semitrailer 12 is provided with a semitrailer axle load sensor 81 which delivers an electrical output signal that can be processed by the electronic control unit and is a measure of the semitrailer load $m_{AHA}$ supported on its rear axle(s) 49.

In this case, the value $l_{AV}$ is provided by relationship $$l_{AV} = l_A \cdot \frac{m_{AHA}}{m_A} \quad (23)$$

and the value $l_{AH}$ is provided once again by the relationship (20).

If (as is assumed for the embodiment selected for the purpose of explanation) a "kink" angle ($\phi$) sensor 67 is provided, the length $l_A$ of semitrailer 12 measured between fifth wheel 47 and semitrailer axle 49 can be determined adaptively according to the relationship $$l_A = \frac{R_H - R_A\sqrt{1+\tan^2\varphi}}{\sin\varphi} + R_A\tan\varphi \quad (24)$$

in which $\phi$ represents the kink angle that the lengthwise central planes 68 and 69 of tractor 11 and semitrailer 12 form with one another when rounding a curve, $R_H$ represents the average road radius of the rear wheels of the tractor, and $R_A$ represents the average road radius of the wheels of the semitrailer axle 49, which are obtained from the following relationship during steady-state rounding of a curve at low speed and transverse acceleration:

$$R_{H,A} = \frac{b_{H,A}}{v_{H,Aleft} - v_{H,Aright}} \cdot \frac{(v_{H,Aleft} + v_{H,Aright})}{2} \quad (25)$$

where $b_H$ represents the wheelbase of the rear axle of tractor 11 and $b_A$ represents the wheelbase of semitrailer axle 49 and $v_{H,Aleft}$ and $V_{H,Aright}$ represent the wheel speeds at the respective axles.

It is assumed in this case that the wheelbases $b_{H,A}$ are known and are stored in a memory of the electronic control unit, so that they can be called up as auxiliary values.

Relationship (25) is valid in the approximation that all the vehicle wheels roll on concentric circles.

In addition, the following relationship is valid for the distance $l_{SH}$ of the fifth wheel 47 from the rear axle 44 of the tractor:

$$l_{SH} = \frac{R_H - R_A\sqrt{\tan^2\varphi + 1}}{\tan\varphi} \quad (26)$$

As a result, the value $l_G$ can be determined according to the relationship $$l_G = l_H - l_{SH} \quad (27)$$

when the position of the center of gravity is known ($l_V$, $l_H$). This relationship can vary depending on the design of the fifth wheel with which the tractor is equipped.

Advantageously, the electronic control unit is so designed to evaluate the relationship (25) for the front wheels of the tractor as well so that the average road radius is also determined in addition to the average curve radius RH of the rear wheels. Then, the wheelbase $l_z$ of tractor 11 can be determined according to the relationship $$l_z = \sqrt{R_v^2 - R_H^2} \quad (28)$$

The latter can also be determined according to the relationship $$l_z = \frac{\delta}{\dot{\Psi}_z} \cdot v \quad (29)$$

when rounding a curve at a low acceleration, where $\delta$ is the steering angle, $\dot{\Psi}_z$ is the yaw rate of tractor 11, and v is the speed of the vehicle, each of which can be determined by the respective sensor.

The electronic control unit 25 is also designed for an operating mode in which tractor 11 of tractor-trailer unit 10 is used, so to speak, as its "own" axle load sensor. A prerequisite for this arrangement is that, for the tractor alone, its mass $m_Z$, the ratio $f_{MZ}$ of the design of the front wheel brakes relative to those of the rear wheel brakes, assuming the same braking characteristics $C_{VA}$ and $C_{HA}$ for the front wheel brakes and the rear wheel brakes, indicates by what factor ($f_{MZ}$) the front axle braking force $B_{VA}$ is greater than the rear axle braking force $B_{HA}$; and tire constants $k_{HA}$ and $k_{VA}$ are known by which the brake slip $\lambda_{HA}$ and $\lambda_{VA}$ are linked with the braking forces that can be exerted by the wheel brakes, $B_{HA}$ and $B_{VA}$, by relationship $$\lambda_{HA,VA} = k_{HA,VA} \cdot B_{HA,VA}/P_{HA,VA} = k_{HA,VA} \cdot \mu_{HA,VA} \quad (30)$$

in which $P_{HA}$ represents the rear axle load and $P_{VA}$ represents the front axle load of tractor 11, which are obtained when the semitrailer 12 is connected to the tractor 11.

It is also assumed that the total mass $m_{ges}$ is known, for example it can be determined by relationship (17).

An acquisition—"measurement"—of the rear axle load $P_{HA}$ is then possible as follows: during a brake application in which only a moderate vehicle deceleration Z is to be achieved, the electronic control unit is controlled in such fashion that only the rear wheel brakes are activated so that the following relationship applies:

$$m_{ges} \cdot Z = \mu_{HA} \cdot P_{HA} \quad (31)$$

in which $\mu_{HA}$ represents the adhesion coefficient that is critical at the rear axle of the tractor between the road and the braked vehicle wheels. According to relationship $$\lambda_{HA} = k_{HA} \cdot \mu HA \quad (32)$$

$\lambda_{HA}$ is linked to the braking slip $\mu_{HA}$ that develops at the rear axle. Such slip in turn is defined by the relationship $$\lambda_{HA} = \frac{n_o - n_{HA}}{n_o} [\%] \quad (33)$$

in which $n_0$ represents the wheel rpm values detected by the wheel rpm sensor for non-braked vehicle wheels, for example the front wheels of the tractor, and $n_{HA}$ represents the average wheel rpm of the braked rear wheels of the vehicle.

Vehicle deceleration Z can be determined by differentiating the wheel rpm values for the non-braked vehicle wheels according to relationship $$Z = \left(\frac{dn_o}{dt}\right). \tag{34}$$

This evaluation is likewise performed by the electronic control unit.
By evaluating the relationship $$P_{HA} = \frac{m_{ges} \cdot Z \cdot k_{HA}}{\lambda_{HA}} \tag{35}$$

which follows directly from relationships (31) and (32), in this operating mode of the braking system, the rear axle load $P_{HA}$ is determined from the measured values Z and $\lambda_{HA}$ which pertains at the rear axle of tractor 11 when semitrailer 12 is connected.

In the course of brake applications in which only moderate vehicle decelerations are likewise controlled and set to essentially the same momentary values of the wheel rpm values, (which also corresponds to essentially identical momentary values of brake slip $\lambda_{HA}$ and $\lambda_{HA}$ at the front axle and the rear axle of the tractor), the following relationship applies:

$$\frac{\lambda_{HA}}{\lambda_{VA}} = \frac{k_{HA} \cdot \mu_{HA}}{k_{VA} \cdot \mu_{VA}} = \frac{k_{HA} \cdot \frac{B_{HA}}{P_{HA}}}{k_{VA} \cdot \frac{B_{VA}}{P_{VA}}} = \frac{k_{HA} \cdot \frac{P_{HA} \cdot C_{HA}}{P_{HA}}}{k_{VA} \cdot \frac{P_{VA} \cdot f_{MZ} \cdot C_{VA}}{P_{VA}}} \tag{36}$$

or if $C_{HA}=C_{VA}$ can be assumed, $$\frac{\lambda_{HA}}{\lambda_{VA}} = \frac{k_{HA} \cdot P_{HA} \cdot P_{VA}}{k_{VA} \cdot P_{VA} \cdot f_{MZ} \cdot P_{HA}} = 1 \tag{36'}$$

By measuring the pressures $P_{VA}$ and $P_{HA}$ with which the actuators of the front axle brakes and the actuators of the rear axle brakes are controlled, the corresponding pressure ratio $$P_{VA}/P_{HA}=a \tag{37}$$

can be determined, and from that, by evaluating relationship (36'), the ratio of the front axle load $P_{VA}$ to the rear axle load $P_{HA}$ of the tractor can be determined from the with relationship $$\frac{P_{VA}}{P_{HA}} = \frac{k_{VA} \cdot f_{MZ} \cdot a}{k_{HA}}. \tag{38}$$

From the latter relationship, it follows directly that $$P_{VA} = \frac{k_{VA} \cdot f_{MZ} \cdot a}{k_{HA}} \cdot P_{HA} \tag{39}$$

also, in conjunction with relationship (35), $$P_{VA} = k_{VA} \cdot f_{MZ} \cdot a \cdot m_{ges} \cdot \frac{Z}{\lambda_{HA}}.$$

When the axle loads and $P_{VA}$ and $P_{HA}$ are known, relationship $$P_{AL} = m_{ges} \cdot g - (P_{VA} + P_{HA}) \tag{40}$$

applies for the axle load $P_{AL}$ of the semitrailer.

Figure 5:
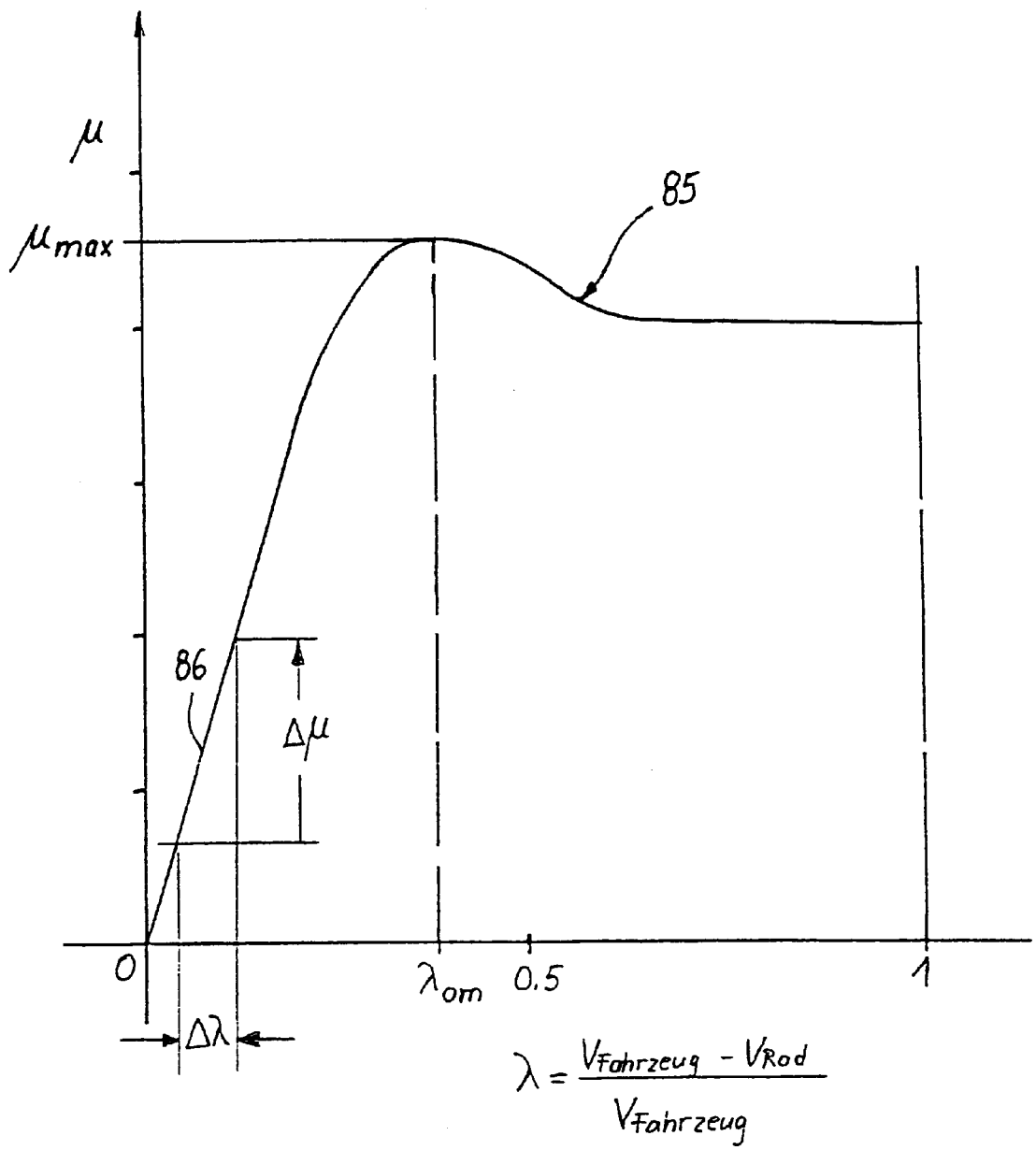
FIG. 5 is a $\mu/\lambda$ graph to explain the determination of tire constants.

To explain an adaptive determination of the tire constants $k_{VA}$ and $k_{HA}$ which link the brake slip $\lambda$ to the braking force (in accordance with the proportionality relationship (30)), and therefore with the adhesion coefficient $\mu$ utilized in a brake application at the braked vehicle wheel, reference is now made to the graph in FIG. 5. This graph shows qualitatively the curve of a tire characteristic ($\mu/\lambda$ curve) indicated as a whole by 85, with the adhesion coefficient $\mu$ that is used in each case indicated and plotted on the ordinate, as a function of brake slip $\lambda$, which is plotted on the abscissa.

It can be determined qualitatively from this graph that with an increase in the brake actuating force that involves an increase in slip $\lambda$ up to an optimum value $\lambda_{OM}$, the portion of the normal force acting on the wheel that can be used for decelerating the vehicle which is provided by the adhesion coefficient $\mu$, increases up to a maximum value $\mu_{max}$. Thereafter, with a further increase in brake slip $\lambda$, it decreases again in order finally to reach its marginal value $\mu_G$ at the value $\lambda=1$ which corresponds to the coefficient sliding friction with the vehicle wheel blocked.

In the range of small values of brake slip $\lambda$ the usable adhesion coefficient $\mu$ for brake slip satisfies the relationship $\mu \cdot k = \lambda$, as indicated by the initial section 86 of the $\mu/\lambda$ curve 85. The latter curve forms a straight line in the graph, with slope $k = \Delta\lambda/\Delta\mu$ that represents the tire constant (in relationship (30) represented by $k_{HA}$ and $k_{VA}$ relative to the axis) This tire constant is generally different from one wheel to the next and as a rule changes its value even over a longer operating time of the vehicle. For example, it changes due to aging of the tire material and/or as a result of temperature influences that can change the frictional properties of a tire.

In order to take such influences adequately into account as they relate to the wheels, whenever the tractor 11 is driven alone with a known mass m, and axle load distribution $P_V/P_H$, the tire constants $k_{VAl}$, $k_{VAr}$, $k_{HAl}$, and $k_{HAr}$ of the left front wheel (VAl), right front wheel (VAr), left rear wheel (HAl), and right rear wheel (HAr) of tractor 11 are determined adaptively.

Since the front wheels of the tractor are not driven and the rear wheels of the vehicle are coupled to one another drivewise by a conventional compensating transmission, an adaptive determination of the tire constants of the front wheels of vehicle 10, automatically controlled by the electronic control unit, is possible as follows:

During a moderate brake application, by which the driver wants to achieve an only moderate vehicle deceleration of 0.2 g for example (g=9.81 ms$^{-1}$), and therefore operates the brake pedal at only a moderate speed $\dot{\phi}$, in both the initial phase of the brake application (in which the deceleration setpoint provision "slowly" changes) and also in the steady-state phase of the brake application (during which the driver no longer changes the brake pedal position), at short time intervals the vehicle deceleration Z ($\lambda_{VAl,r}$) and the brake slip $\lambda_{VAl,r}$ (which is correlated with the vehicle deceleration that is being measured) are determined, and the tire constants $k_{VAl}$ and $k_{VAr}$ of the respective front wheels are determined from an averaging or interpolating processing of the respective value pairs.

Here, when the left front wheel is being braked, its slip $\lambda_{VAl}$ is determined according to relationship $$\lambda_{VAl} = \frac{n_{VAr} - n_{VAl}}{n_{VAr}} \quad (41)$$

If the right front wheel is being braked alone, its slip $\lambda_{V_{Ar}}$ is $$\lambda_{VAr} = \frac{n_{VAl} - n_{VAr}}{n_{VAl}} \quad (42)$$

In both cases, the wheel rpm values $n_{Var}$ and $n_{VAl}$ that appear in the numerators of relationships (41) and (42), that of the unbraked front wheel is chosen as the reference rpm.

The tire constants $k_{VAl}$ and $k_{VAr}$ are obtained for the initial phase of the brake application, in which only one front wheel is braked at a time, by evaluation of relationship $$k_{VAl,r} = \frac{\lambda_{VAl,r} \cdot P_{VA}}{Z_f \cdot m_z \cdot 2} \quad (43)$$

in which $P_{VA}$ represents the front axle load.

Similarly, the tire constants $k_{HAl,r}$ are determined according to relationship $$k_{HAl,r} = \frac{\lambda_{HAl,r} \cdot P_{HA}}{Z_f \cdot m_z \cdot 2} \quad (44)$$

in which $P_{HA}$ represents the rear axle load.

The values $\lambda_{HAl}$ and $\lambda_{HAr}$ of the brake slip of the respective braked rear wheels that are taken into account in an evaluation of relationship (44) can be determined according to relationships $$\lambda_{HAl} = \frac{\lambda_{VAl,r} - n_{HAl}}{n_{VAl,r}} \quad (45)$$

and $$\lambda_{HAr} = \frac{\lambda_{VAl,r} - n_{HAr}}{n_{VAl,r}} \quad (46)$$

During braking of one of the rear wheels, the drive coupling of the rear wheels by a compensating transmission leads to an acceleration of the other rear wheel that is not braked.

Under the generally realistic assumption that the rear wheels that are assumed to be driven have the same tires and that the same is also true for the front wheels of the vehicle, with a knowledge of the total mass and axle load distribution of the tractor, the "axlewise" tire constants $k_{VA}$ and $k_{HA}$ can also be determined for the tractor. The rear axle tire constant $k_{HA}$ is determined when the tractor is pulling and the front axle tire constant $k_{VA}$ is determined when the value of the rear axle tire constant is known during braking.

The determination of the rear axle tire constant $k_{HA}$ is performed in an operating situation of the vehicle in which its forward acceleration $Z_{vorwärts}$ is constant. The forward acceleration $Z_{vorwärts}$ is provided by relationship $$Z_{vorwärts} = \frac{F_{vorwärts}}{m_{ges}} = \frac{P_{HA} \cdot \lambda_{HAntrieb}}{k_{HA} \cdot (P_{VA} + P_{HA})} \quad (47)$$

and the drive slip $\lambda_{HAntrieb}$ is given by relationship $$\lambda_{HAtrieb} = \frac{n_{HA} - n_{VA}}{n_{HA}} [\%]. \quad (48)$$

The forward acceleration $Z_{vorwärts}$ is advantageously determined by differentiating the wheel rpm values $n_{VA}$ of the front wheels.

From relationship (47) that is valid for the forward acceration $Z_{vorwärts}$, relationship $$k_{HA} = \frac{\lambda_{HAntrieb} \cdot P_{HA}}{Z_{vorwärts} \cdot (P_{VA} + P_{HA})} \quad (49)$$

follows directly for the rear axle tire constant $k_{HA}$, which can be evaluated on the basis of the measured values of the forward acceleration $Z_{vorwärts}$ and the drive slip.

From relationship (49) for the rear axle tire constant $k_{HA}$ relationship $$k_{HA}\left(\frac{P_{VA}}{P_{HA}} + 1\right) = \frac{\lambda_{HAtrieb}}{Z_{vorwärts}} \quad (49')$$

is obtained for the ratio of the drive slip to the forward acceleration. From this it is evident that this ratio represents a vehicle-specific constant $M_k$ that satisfies relationship $$m_k = k_{HA} \cdot \left(\frac{P_{VA}}{P_{HA}} + 1\right). \quad (49'')$$

In the light of relationship (38) that is valid for the axle load ratio $P_{VA}/P_{HA}$ $$\frac{P_{VA}}{P_{HA}} = \frac{k_{VA} \cdot f_{MZ} \cdot a}{k_{HA}}$$

the relationship $$k_{VA} = \frac{m_k - k_{HA}}{f_{MZ} \cdot a} \quad (50)$$

is obtained for the front axle tire constant $k_{VA}$.

In this relationship (50), a represents the pressure ratio $P_{VA}/P_{HA}$ that corresponds to relationship (37), which can be determined during braking operation of the vehicle in which the braking forces are regulated so that the wheel rpm values of all the vehicle wheels are identical.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for driving dynamic regulation of a road vehicle in which reference values for at least a yaw rate $\dot{\Psi}$ and a float angle $\beta$ of the vehicle are generated, under clock control in sequential cycles of a presettable duration $T_K$, by a simulation computer in an electronic control unit which automatically regulates driving dynamics of the vehicle based on a model that represents the vehicle in terms of design and load state parameters thereof, and based on operating data which includes measured current values of steering angle $\delta$ and vehicle speed $v_x$, said simulation computer generating control signals for activating at least one wheel brake of the vehicle based on a comparison of a reference value $\dot{\Psi}_{SO}$ as a setpoint for the yaw rate of the vehicle and actual values $\dot{\Psi}_I$ of the yaw rate of the vehicle that are continuously recorded a yaw rate sensor device, or for reducing an engine drive torque of the vehicle; wherein the vehicle model is implemented by a linear differential equation system of the form $$[P]\cdot(\dot{\overline{X}})=[Q]\cdot(\overline{X})+(\overline{C})\cdot\delta(t)$$

in which [P] represents a 4×4 matrix with elements $p_{ij}$ ($p_{ij}$=0,$m_Z$v,0,0; 0,0,0,$J_Z$; 0,0,0,0; 0,–1,0,0) $m_Z$ being a mass of the vehicle, $J_Z$ being a yaw moment of inertia of the vehicle, and v being a lengthwise velocity of the vehicle; [Q] represents a 4×4 matrix with elements $q_{ij}$ ($q_{ij}$=0, $-C_v-C_H$, 0, $-m_z\cdot v-(C_v l_v-C_H l_H)/v$; 0, $C_H l_H-C_v l_v$, 0, $(-1_v{}^2 C_v-1_H{}^2 C_H)/v$; 0,0,0,0; 0,0,0,1), $C_V$ and $C_H$ being diagonal travel stiffnesses of front and rear wheels of the vehicle respectively, and $l_V$ and $l_H$ being a distance between vehicle center of gravity and a front axle or a rear axle; $\overline{C}$ represents a four-component column vector with components $c_i$ ($c_i$=$c_V$,$C_V l_V$,0,0); $\overline{X}$ represents a four-component column vector formed from state values $\beta_Z$ and $\dot{\Psi}_z$ with components $x_i$ ($x_i$=0, $\beta_z$, 0, $\Psi_z$); and $\dot{\overline{X}}$ represents the time derivative $d\overline{X}/dt$ of the column vector $\overline{X}$; and driving-dynamic state values $\beta_Z(k-1)$ and $\dot{\Psi}_z(k-1)$ are determined at a point in time $t(k-1)$, and updated at a point in time $t(k)$ that is later by the clock time interval $T_K$, by evaluation of a system of equations $$\overline{X}(k) = \left\{\frac{[P]}{T_k} - [Q]\right\}^{-1} \cdot \left\{\frac{[P]}{T_k} \cdot \overline{X}(k-1) + \overline{C}\cdot\delta(k)\right\}$$

with values of matrix elements $p_{ij}$ and $q_{ij}$ that are updated at a point in time $t(k)$.

2. The method according to claim 1, wherein:
the road vehicle includes a tractor; and
a float angle $\beta_Z$ at a low constant speed of the tractor, is also checked by evaluating a relationship $$\beta_z = \delta \cdot \frac{1_H}{1_z}.$$

3. The method according to claim 1 wherein:
the road vehicle includes a tractor; and
the float angle $\beta_Z$ of the tractor is also obtained by evaluating a relationship $$\beta_z = \int_{t_{0(\delta=0)}}^{t_{c(\delta=\delta_c)}} \left(\frac{a_q}{v} - \Psi\right) dt$$

for an integration time interval $t_i=t_c-t_0$, within which a driver of the tractor sets a steering angle $\delta$ required for rounding a curve with $a_q$ being transverse acceleration of the vehicle.

4. The method according to claim 1, wherein:
the road vehicle comprises a tractor and a semitrailer connected to the tractor;
zero elements $p_{11}$, $p_{21}$, $p_{31}$, $p_{33}$, $p_{41}$, $p_{43}$, and $p_{44}$ of the matrix [$P_Z$] representing the tractor alone for driving-dynamic acquisition of state values $\beta_A$ (float angle) and $\dot{\Psi}_A$ (yaw rate) of the semitrailer are replaced by elements $p_{11}=m_A$ V, $p_{21}=m_A v 1_G$, $p_{31}=m_A v 1_{AV}$, $p_{33}=J_A$, $p_{41}=1$, $p_{43}=1_{AV}/v$, and $p_{44}=1_G/v$;

zero elements $q_{11}$, $q_{13}$, $q_{21}$, $q_{23}$, $q_{31}$, $q_{33}$, and $q_{43}$ of the matrix [Q] representing the tractor alone, are replaced by matrix elements $q_{11}=-C_A$, $q_{13}=-m_A v+C_A 1_{AH}/v$, $q_{21}=C_A 1_G$, $q_{23}=m_A v 1_{G-C_A} 1_G 1_{AH}/v$, $q_{31}=C_A 1_{AV}+C_A 1_{AH}$, $q_{33}=m_A v 1_{AV}-(C_A 1_{AV} 1_{AH}+C_A 1_{AH}{}^2)/v$ and $q_{43}=-1$; and state vector $\overline{X}$ and its time derivation $\dot{\overline{X}}$ are supplemented by components $x_1=\beta_A$ and $x_3=\dot{\Psi}_A$ as well as $\dot{x}_1=\dot{\beta}_A$ and $\dot{x}_3=\ddot{\Psi}_A$, where $m_A$ is mass of the semitrailer, $1_G$ is distance of the fifth wheel measured in the lengthwise direction of the vehicle from a center of gravity of the tractor, $1_{AV}$ is a distance of a center of gravity of the semitrailer from a fifth wheel of the vehicle, $1_{AH}$ is a distance of a semitrailer center of gravity from an axis of the fifth wheel, $C_A$ represents diagonal travel stiffness and $J_A$ represents a yaw moment of inertia of semitrailer.

5. The method according to claim 1 for a tractor-trailer unit with a two-axle tractor and a one-axle semitrailer, wherein:
a float angle $\beta_A$ of semitrailer is obtained by evaluation of a relationship $$\beta_A = \varphi + \beta_z - \frac{\Psi(1_G + 1_{AV})}{v}$$

in which $\phi$ represents a kink angle that increases inversely with a value of steering angle $\delta$, said kink angle being enclosed by lengthwise central planes of the tractor and the semitrailer that intersect at a fifth wheel of tractor-trailer unit.

6. The method according to claim 5, wherein the kink angle $\phi$ is obtained by evaluating a relationship $$\varphi = 180° - \arccos\left(\frac{1_A}{\sqrt{R_A^2 + 1_A^2}}\right) - \arccos\left(\frac{R_A^2 - R_v^2 + 1_v^2 - 1_A^2}{2 \cdot 1_v \sqrt{R_A^2 + 1_a^2}}\right)$$

in which $R_V$ represents an average curved path radius of front wheels of the tractor and $R_A$ represents an average curved path radius of wheels of semitrailer, with $R_V$ and $R_A$ being provided by a relationship $$R_{V,A} = \frac{b_{spurV,A} \cdot v_{AchseV,A}}{(v_{Rl} - v_{Rr})_{V,A}}$$

in which $b_{spurV,A}$ represents track widths at a front axle of the tractor ($b_{spurV}$) and at a semitrailer axis ($b_{spurA}$), $v_{Rl}$ and $V_{Rr}$ represent wheel circumferential velocities at left and right wheels of the respective vehicle axles, and $v_{AchseV,A}$ refers to respective algebraic average wheel speeds.

7. The method according to claim 1 for a tractor-trailer unit with a two-axle tractor and a single-axle semitrailer, wherein at least one of diagonal travel stiffnesses $C_V$ and $C_H$ of wheels of the tractor and diagonal travel rigidity $C_A$ of the wheels of semitrailer during steady-state rounding of a curve by the tractor or the tractor-trailer unit, are determined by evaluating the following relationships:

$$0 = (C_H 1_H - C_v 1_v)\beta_z - \left(\frac{C_v 1_v^2 + C_H 1_H^2}{v}\right)\dot{\Psi} +$$
$$C_A 1_G \beta_A + \left(m_A v l_G - \frac{C_A 1_{AH} 1_G}{v}\right)\dot{\Psi} + C_v 1_v \delta$$

$$0 = (C_H 1_H - C_v 1_v)\beta_z - \left(\frac{C_v 1_v^2 + C_H 1_H^2}{v}\right)\dot{\Psi} +$$
$$C_A 1_G \beta_A + \left(m_A v l_G - \frac{C_A 1_{AH} 1_G}{v}\right)\dot{\Psi} + C_v 1_v \delta$$

$$0 = C_A(1_{AV} + 1_{AH}) \cdot \beta_A + \left(m_A v l_{AV} - \frac{C_A 1_{AH}(1_{AV} + 1_{AH})}{v}\right)\dot{\Psi}.$$

in which $\dot{\Psi}$ represents an identical yaw rate for the tractor and semitrailer.

8. A device for driving dynamic regulation of a road vehicle whose wheel brake are controlled by output signals from an electronic control unit, both in response to a driver's input command to decelerate the vehicle by actuating a set value transducer, and also by way of maintaining a dynamically stable driving behavior, said wheel brakes being actuatable individually or together so that deviations of a yaw rate $\dot{\Psi}$, for which a yaw rate sensor is provided and which can be controlled when rounding a curve by specifying a steering angle $\delta$, can be compensated by a setpoint obtained from a steering angle specification and measured vehicle speed, by way of an approximation of the setpoint, with a simulation computer being provided for setting the setpoint based on a vehicle model in which the vehicle is defined by design-related values, a load state, and operating data, and based on measured values of at least steering angle $\delta$ and vehicle lengthwise velocity $v_x$, said simulation computer generating reference values for at least a yaw rate $\dot{\Psi}$ of the vehicle, and being designed for a clock-controlled evaluation of motion equations of a tractor-trailer unit as a vehicle reference model and also of motion equations of a two-axle motor vehicle, wherein said simulation computer comprises a computer readable memory encoded with:

routines to be implemented by the electronic control unit, for adaptive determination of selected values from parameters ($n_{Vl}$, $n_{Vr}$, $n_{Hl}$, $n_{Hr}$, $n_{Al}$, $n_{Ar}$, $M_{mot}$, $P_{VA}$, and $P_{HA}$) that can be measured while driving the vehicle or a unit consisting of the vehicle as a tractor and trailer, said selected values being
  a) total mass $m_{ges}$ of the tractor-trailer unit
  b) mass $m_z$ of the tractor
  c) mass $m_A$ of the trailer
  d) wheelbase $1_Z$ of the tractor
  e) axle load distribution $P_{VA}/P_{HA}$ of the tractor, and
  f) axle load distribution of the tractor-trailer unit and/or the rear axle load $P_A$ of the trailer; and
routines to be implemented by the electronic control unit, for estimating the following
  g) a moment of inertia $J_Z$ of the tractor around a vertical axis thereof, and
  h) a moment of inertia $J_A$ of the trailer around its vertical axis.

9. The device according to claim 8 wherein at least one of mass $m_Z$ of the tractor and mass$_{ges}$ of the tractor-trailer unit are determined by an evaluation of a relationship $$m_{Z,ges} = \frac{M_{mot} \cdot \frac{n_{mot}}{v} \cdot \eta}{(Z_{HSP} - Z_{ist}) \cdot v}$$

in which $M_{mot}$ represents engine output torque, $n_{mot}$ represents engine rpm, $v$ represents vehicle speed, $\eta$ represents total efficiency of a front wheel drive transmission line of the tractor characterized by a dimensionless number <1, $Z_{HSP}$ which represents a vehicle deceleration that takes place in an up-shift phase in which a vehicle operator engages a gear that corresponds to a lower engine rpm, and $Z_{ist}$ represents an acceleration that takes place during acceleration of the vehicle that occurs after a gear change, with a mass $m_A$ of the trailer being determined by evaluating relationship $m_A = m_{ges} - m_Z$.

10. The device according to claim 8 wherein the electronic control unit uses output signals from wheel rpm sensors assigned individually to the wheels of the tractor to determine the wheelbase $1_z$ of the tractor according to relationship $$1_z = \sqrt{R_V^2 - R_H^2}$$

in which $R_V$ and $R_H$ represent average road radii determined during steady-state rounding of a curve and moderate vehicle speed according to relationship $$R_{V,H} = \frac{b_{V,H} \cdot (v_{V,Hl} + v_{V,Hr})}{(v_{V,Hl} + v_{V,Hr}) \cdot 2}$$

for the front and rear wheels of the tractor, with $b_{V,H}$ representing wheelbases $b_V$ and $b_H$ at front and rear axles of the tractor and $V_{V,Hl}$ and $v_{V,Hr}$ being wheel speeds of left and right front and rear wheels of the tractor.

11. The device according to claim 8 wherein the electronic control unit determines the wheelbase $1_Z$ of the tractor by evaluating a relationship $$1_z = \frac{\delta}{\dot{\Psi}_z} \cdot v_z.$$

12. The device according to claim 8 for a tractor-trailer unit in which each vehicle wheel has a wheel rpm sensor, wherein
an electronic or electromechanical kink angle sensor is provided for detecting an angle $\phi$ at which respective vertical lengthwise central planes of the tractor and the trailer of the tractor-trailer unit intersect at its fifth wheel when the tractor-trailer unit is rounding a curve; and
the electronic control unit determines a length $1_A$ between the fifth wheel and an axle of the trailer, by evaluating a relationship $$1_A = \frac{R_H - R_A \sqrt{1 + \tan^2 \varphi}}{\sin \varphi} + R_A \tan \varphi$$

in which $R_H$ and $R_A$ are average road radii $R_{H,A}$ of rear wheels of the tractor and wheels of the trailer axle, which in turn can be determined by relationship $$R_{H,A} = \frac{b_{H,A}(v_{H,Al} + v_{H,Ar})}{(v_{H,Al} + v_{H,Ar}) \cdot 2}$$

in which $b_{HA}$ represents wheel bases $b_H$ and $b_A$ of rear axles of the tractor and the semitrailer.

13. The device according to claim 12, wherein the electronic control unit determines a length $l_{SH}$ between the fifth wheel and a rear axle of tractor by evaluating a relationship $$l_{SH} = \frac{R_H - R_A\sqrt{\tan^2\varphi + 1}}{\tan\varphi}.$$

14. The device according to claim 8 wherein the tractor has at least one axle load sensor which generates an electrical output signal that can be processed by the electronic control unit, said signal being a measure of a load supported on the road by a vehicle axle whose load is monitored.

15. The device according to claim 14 wherein the electronic control unit determines a distance $l_V$ between a center of gravity of the tractor and a front axle of the tractor according to a relationship $$l_v = l_z \cdot \frac{P_{HA}}{m_z}$$

when the at least one axle load sensor is associated with the rear axle of the vehicles, and determines this distance $l_V$ by a relationship $$l_v = l_z \cdot \left(1 - \frac{P_{VA}}{m_z}\right)$$

when the at least one axle load sensor is associated with the front axle of the vehicle.

16. The device according to claim 8 wherein:

the tractor-trailer unit has a trailer equipped with an axle load sensor which generates an electrical output signal that is characteristic of a load $P_{AHA}$ supported by a trailer axle on the road, and can be processed by the electronic control unit; and the electronic control unit determines a distance $l_{AV}$ between a center of gravity of the trailer and the fifth wheel according to a relationship $$l_{AV} = l_A \cdot \frac{P_{HA}}{m_A}$$

in which $l_A$ represents distance of a vertical trailer axis from the fifth wheel, and $m_A$ represents mass of the trailer.

17. The device according to claim 8 wherein:

the tractor-trailer unit has a tractor equipped with an axle load sensor that generates an electrical output signal that characterizes mass $m_{ZHA}$ supported by a rear axle of the tractor on the road, and can be processed by electronic control unit; and the electronic control unit determines a distance $l_{AV}$ between a center of gravity of the trailer and the fifth wheel according to a relationship $$l_{AV} = l_A \cdot \left(1 - \frac{(m_{ZHA} - m_{ZHAleer})}{m_A}\right) \cdot \frac{l_Z}{l_{SV}}$$

in which $m_{ZHAleer}$ represents mass supported by the rear axle of the tractor without the semitrailer, $m_A$ represents mass of the trailer, and $l_{SV}$ represents a distance between the fifth wheel and a front axle of the tractor.

18. The device according to claim 8 wherein:

the tractor-trailer unit is equipped with a sensor that generates an electrical output signal that is characteristic of a mass share $m_{AS}$ of trailer supported on the tractor at the fifth wheel, and can be processed by the electronic control unit; and the electronic control unit determines a distance $l_{AV}$ between the center of gravity of the semitrailer and the fifth wheel according to relationship $$l_{AV} = l_A \cdot \left(1 - \frac{m_{AS}}{m_A}\right).$$

19. The device according to claim 8 wherein the electronic control unit estimates a yaw moment of inertia $J_Z$ of the tractor and a yaw moment of inertia $J_A$ of the trailer according to relationship $$J_z = (m_v \cdot l_v^2 + m_H \cdot l_H^2) \cdot 1.1$$

and $$J_A = (m_{AV} \cdot l_{AV}^2 + m_{AH} \cdot l_{AH}^2) \cdot 1.1$$

in which $m_v$ represents a share of a mass supported by a front axle of the tractor, $m_H$ represents a share of a mass of the tractor that is supported above a rear axle of the trailer, $l_H$ represents a distance ($l_Z - l_V$) between a center of gravity of the tractor and the rear axle of a tractor, and $m_{AV}$ represents the share of the mass of the trailer supported at the fifth wheel while $m_{AH}$ represents a share of the mass of the trailer supported on the road by the rear wheels of the trailer, and $l_{AH} = l_A - l_{AV}$ represents a distance between the center of gravity of the trailer and a rear axle of trailer.

20. The device according to claim 14 for a truck or a tractor-trailer or towed trailer unit, equipped with air suspension, wherein axle load sensing is implemented by sensing pressure in suspension apparatus at a vehicle axle that is monitored.

21. The device according to claim 8 wherein the electronic control unit determines a rear axle load $P_{HA}$ of the tractor in a braking mode in which, with moderate vehicle deceleration, only rear wheel brakes are actuated by evaluating a relationship $$P_{HA} = \frac{m_{z,ges} \cdot k_{HA} \cdot Z}{\lambda_{HA}}$$

in which Z represents measured vehicle deceleration and $\lambda_{HA}$ represents brake slip determined by a relationship $$\lambda_{HA} = \frac{n_{VA} - n_{HA}}{n_{VA}} [\%]$$

and $k_{HA}$ is a tire constant that corresponds to a ratio $\lambda/\mu$ of an adhesion coefficient $\mu$ to brake slip $\lambda$ produced by brake actuation, and assuming equal wheel diameters of the front and rear wheels, $n_{VA}$ represents wheel rpm values of non-braked wheels, and $n_{HA}$ represents wheel rpms of braked wheels of tractor.

22. The device according to claim 21 wherein the electronic control unit determines a front axle load $P_{VA}$ of tractor-trailer unit by evaluating a relationship $$P_{VA} = \frac{k_{VA} \cdot f_{MZ} \cdot a \cdot P_{HA}}{k_{HA}}$$

in which $k_{VA}$ represents at least one tire constant of front wheels of the tractor, $f_{MZ}$ represents a design ratio of front wheel and rear wheel brakes that corresponds to a ratio $B_{VA}/B_{HA}$ of front axle braking force $B_{VA}$ and rear axle braking force $B_{HA}$, when all the wheel brakes are controlled with equal control pressure; and a represents an actuating pressure ratio $P_{VA}/P_{HA}$ that results when, during a brake application, all braked vehicle wheels are regulated to an equal current velocity by regulating a braking force distribution.

23. The device according to claim 21 wherein an adaptive determination of tire constants $k_{VAl}$ and $k_{VAr}$ of left and right front wheels of the tractor and tire constants $k_{HAl}$ and $k_{HAr}$ of left and right rear wheels is obtained by an evaluation of relationships $$k_{VAl,r} = \frac{\lambda_{VAl,r} \cdot P_{VA}}{2 \cdot Z \cdot m_z}$$

and $$k_{HAl,r} = \frac{\lambda_{HAl,r} \cdot P_{HA}}{2 \cdot Z \cdot m_z}$$

for brake applications with a moderate vehicle deceleration.

24. The device according to claim 23 wherein the tire constants $k_{VAl,r}$ and $k_{HAl,r}$ are determined in alternating cycles in which tire constants $k_{VAl}$ and $k_{HAr}$ and $k_{VAr}$ and $k_{HAl}$ of one front wheel and of the rear wheel of the tractor located diagonally opposite the front wheel are determined.

25. The device according to claim 8 in a vehicle provided with a regulating device that regulates a ratio $$\Phi = \frac{B_{VA}}{B_{HA}}$$

of front axle braking force $B_{VA}$ to rear axle braking force $B_{HA}$ according to a relationship $$\Phi = a + b \cdot Z_{soll}$$

such that during a brake application, all vehicle wheels have essentially equal circumferential velocities, wherein:

for an adaptive determination of an axle-related tire constant $k_{HA}$ for driven vehicle wheels, the electronic control unit evaluates a relationship $$k_{HA} = \frac{\lambda_{HAntrieb} \cdot P_{HA}}{Z_{vorwärts} \cdot (P_{VA} + P_{HA})}$$

in which $\lambda_{HA}$ represents drive slip and $Z_{vorwärts}$ represents vehicle acceleration; and for an adaptive determination of an axle-related tire constant $k_{VA}$ for non-driven vehicle wheels, the electronic control unit evaluates a relationship $$k_{VA} = \frac{m_k - k_{HA}}{f_{MZ} \cdot a}$$

in which $m_k$ represents a constant that in turn is provided by a relationship $$m_k = \frac{k_{HA} \cdot (P_{VA} + P_{HA})}{P_{HA}}.$$

26. The device especially according to claim 8 for a tractor-trailer unit designed as a towing vehicle with at least one trailer wherein both the tractor and the at least one trailer are equipped with a yaw angle sensor.

* * * * *